(12) United States Patent
Yokoyama et al.

(10) Patent No.: US 11,064,176 B2
(45) Date of Patent: Jul. 13, 2021

(54) INFORMATION PROCESSING APPARATUS, INFORMATION PROCESSING METHOD, AND PROGRAM FOR DISPLAY CONTROL TO ARRANGE VIRTUAL DISPLAY BASED ON USER VIEWPOINT

(71) Applicant: SONY CORPORATION, Tokyo (JP)

(72) Inventors: Kazuki Yokoyama, Kanagawa (JP); Koji Aoyama, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/641,083

(22) PCT Filed: Jul. 11, 2018

(86) PCT No.: PCT/JP2018/026126
§ 371 (c)(1),
(2) Date: Feb. 21, 2020

(87) PCT Pub. No.: WO2019/044188
PCT Pub. Date: Mar. 7, 2019

(65) Prior Publication Data
US 2020/0177861 A1 Jun. 4, 2020

(30) Foreign Application Priority Data
Aug. 29, 2017 (JP) .............................. JP2017-164193

(51) Int. Cl.
*H04N 13/122* (2018.01)
*H04N 13/15* (2018.01)
(Continued)

(52) U.S. Cl.
CPC ........... *H04N 13/122* (2018.05); *H04N 13/15* (2018.05); *H04N 13/383* (2018.05); *H04N 13/398* (2018.05)

(58) Field of Classification Search
CPC .... H04N 13/122; H04N 13/15; H04N 13/383; H04N 13/398; H04N 13/106;
(Continued)

(56) References Cited

U.S. PATENT DOCUMENTS

2002/0149622 A1* 10/2002 Uesaki .................... G06T 13/20
715/764
2008/0079660 A1* 4/2008 Fukushima ............ H04N 13/38
345/7
(Continued)

FOREIGN PATENT DOCUMENTS

| JP | H09-121370 A | 5/1997 |
|---|---|---|
| JP | 2003-051029 A | 2/2003 |

(Continued)

OTHER PUBLICATIONS

Yu Yang, Xutang Li, Pin Xu and Jianzeng Li, "A modified method for multiple region depth mapping of stereoscopic image generation," 2016 7th IEEE International Conference on Software Engineering and Service Science (ICSESS), Beijing, 2016, pp. 636-640, doi: 10.1109/ICSESS.2016.7883149. (Year: 2016).*

(Continued)

*Primary Examiner* — Marnie A Matt
(74) *Attorney, Agent, or Firm* — Paratus Law Group, PLLC

(57) ABSTRACT

An information processing apparatus, an information processing method, and a program are provided. The information processing apparatus includes a display control unit that controls display of a display unit such that a stereoscopic image is displayed on a virtual display surface arranged in a space, in which the display control unit controls an arrangement of the virtual display surface in the space on the basis of a position of a viewpoint of a user.

19 Claims, 19 Drawing Sheets

(51) Int. Cl.
*H04N 13/383* (2018.01)
*H04N 13/398* (2018.01)

(58) Field of Classification Search
CPC .... H04N 13/111; H04N 13/38; H04N 13/128; H04N 13/366; G09G 5/36
USPC .......................................................... 348/51
See application file for complete search history.

(56) References Cited

U.S. PATENT DOCUMENTS

| | | | | |
|---|---|---|---|---|
| 2010/0079578 | A1* | 4/2010 | Mihara | H04N 13/302 348/43 |
| 2011/0243388 | A1* | 10/2011 | Sakaguchi | G06T 3/4007 382/103 |
| 2012/0249416 | A1 | 10/2012 | Maciocci et al. | |
| 2015/0103003 | A1* | 4/2015 | Kerr | G06F 3/0481 345/158 |
| 2015/0235355 | A1* | 8/2015 | Mullins | G06K 9/00597 345/633 |
| 2016/0012642 | A1* | 1/2016 | Lee | G06F 3/0481 345/158 |
| 2016/0078685 | A1* | 3/2016 | Koga | H04N 13/38 345/7 |

FOREIGN PATENT DOCUMENTS

| | | |
|---|---|---|
| JP | 2005-073013 A | 3/2005 |
| JP | 2008-085503 A | 4/2008 |
| JP | 2013-237320 A | 11/2013 |
| JP | 2015-008394 A | 1/2015 |
| JP | 2015-012560 A | 1/2015 |
| JP | 2016-018560 A | 2/2016 |

OTHER PUBLICATIONS

Apr. 15, 2020, European Communication issued for related EP Application No. 18851514.2.

* cited by examiner

FIG. 8
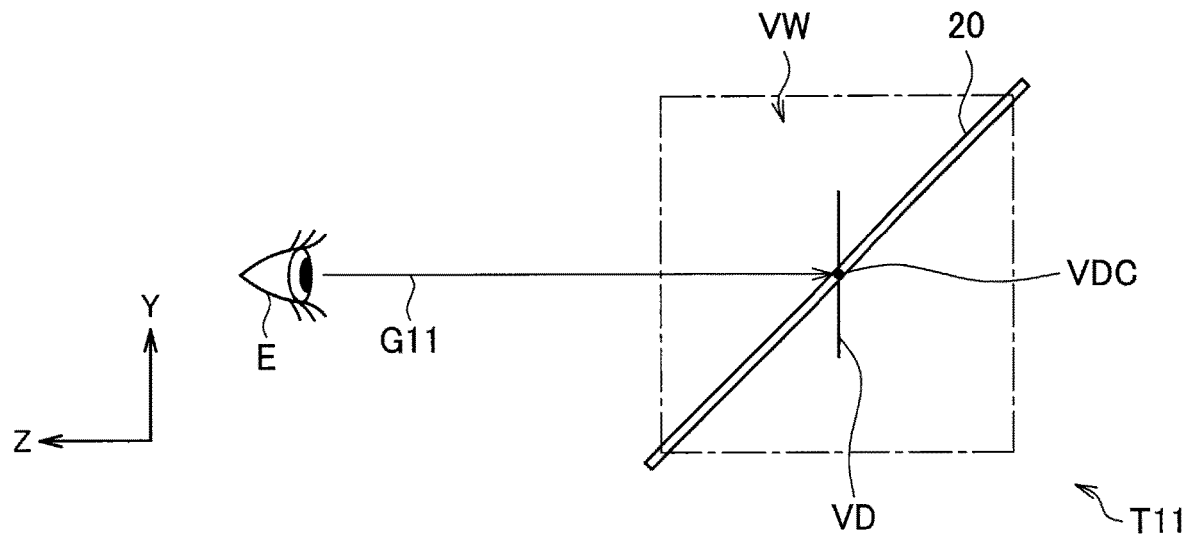
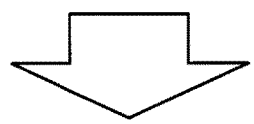
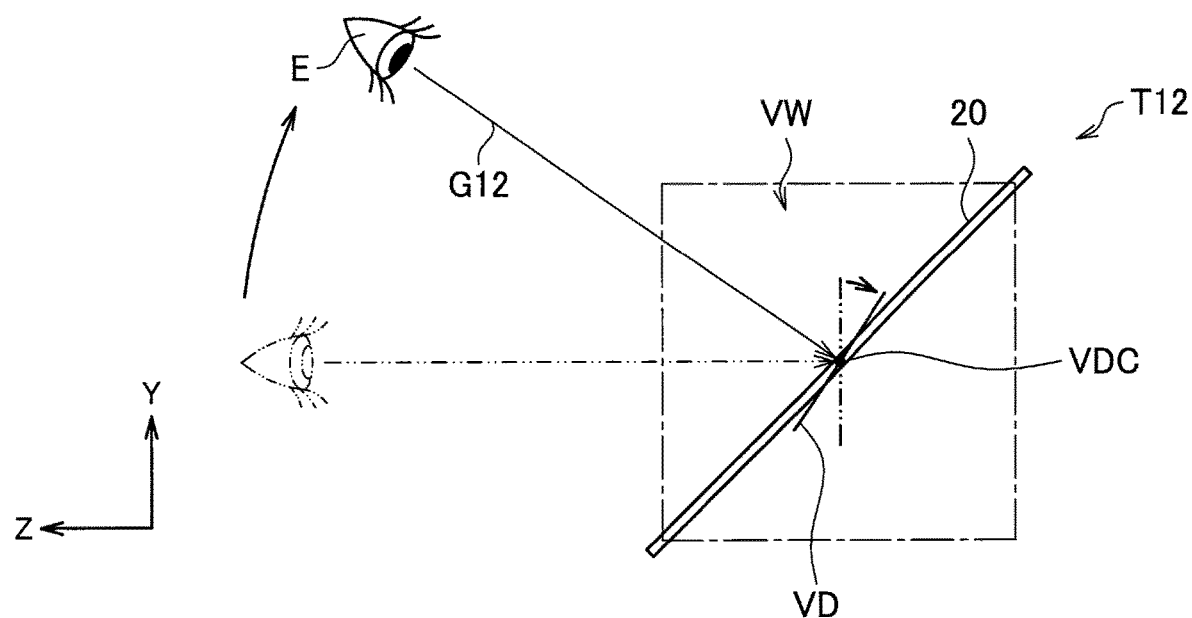

FIG. 9
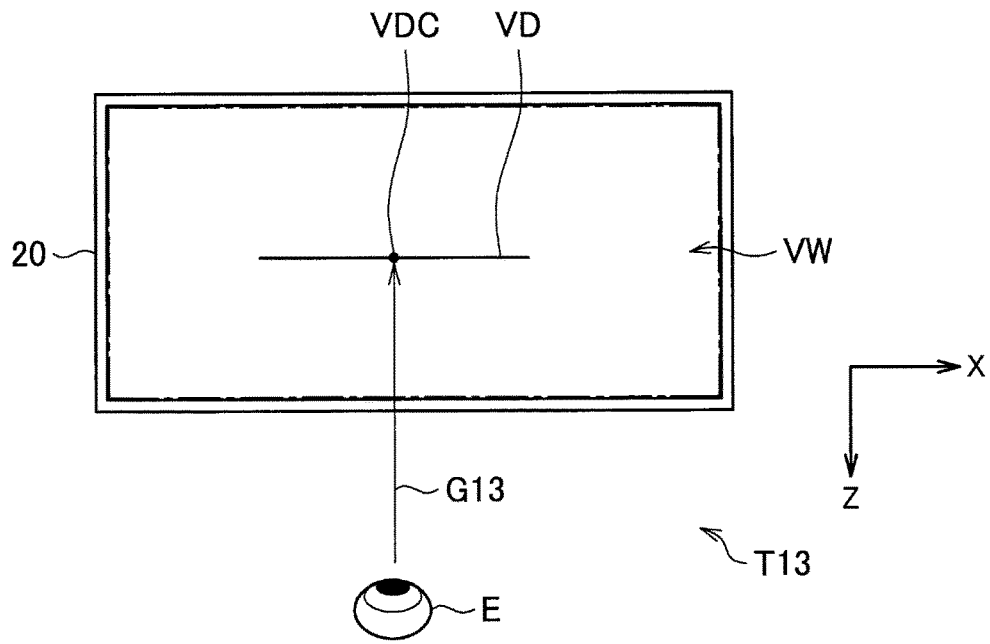
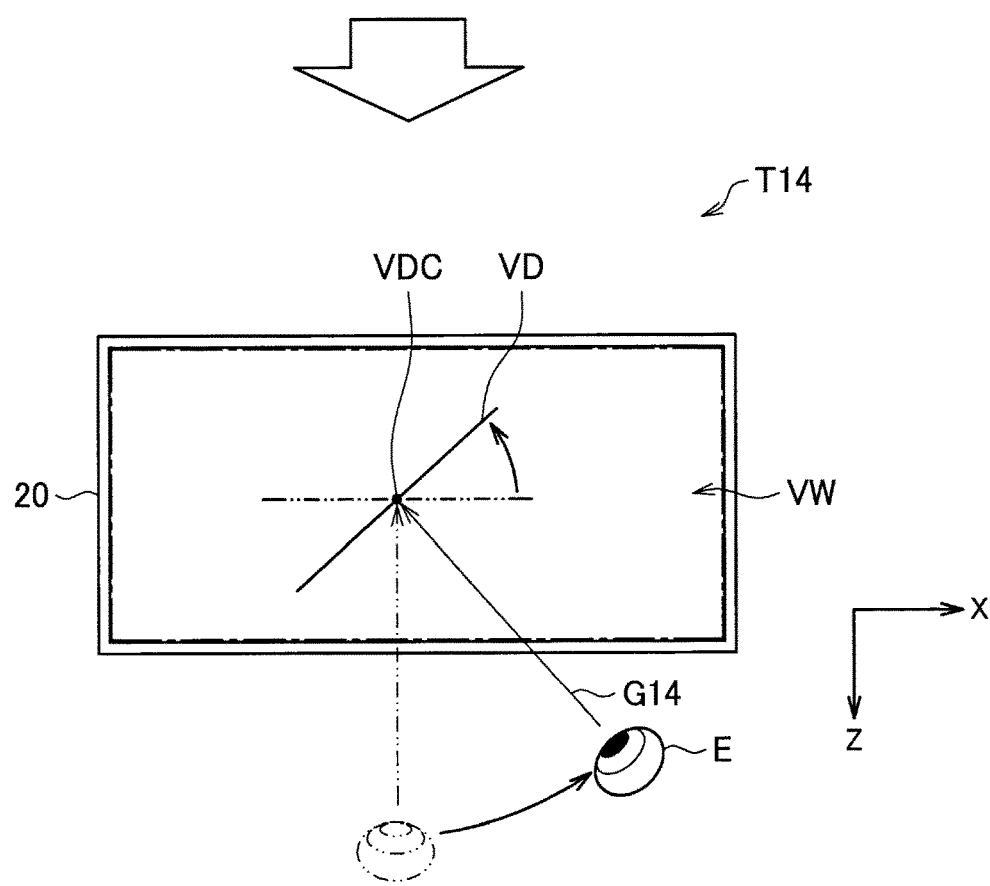

FIG. 12
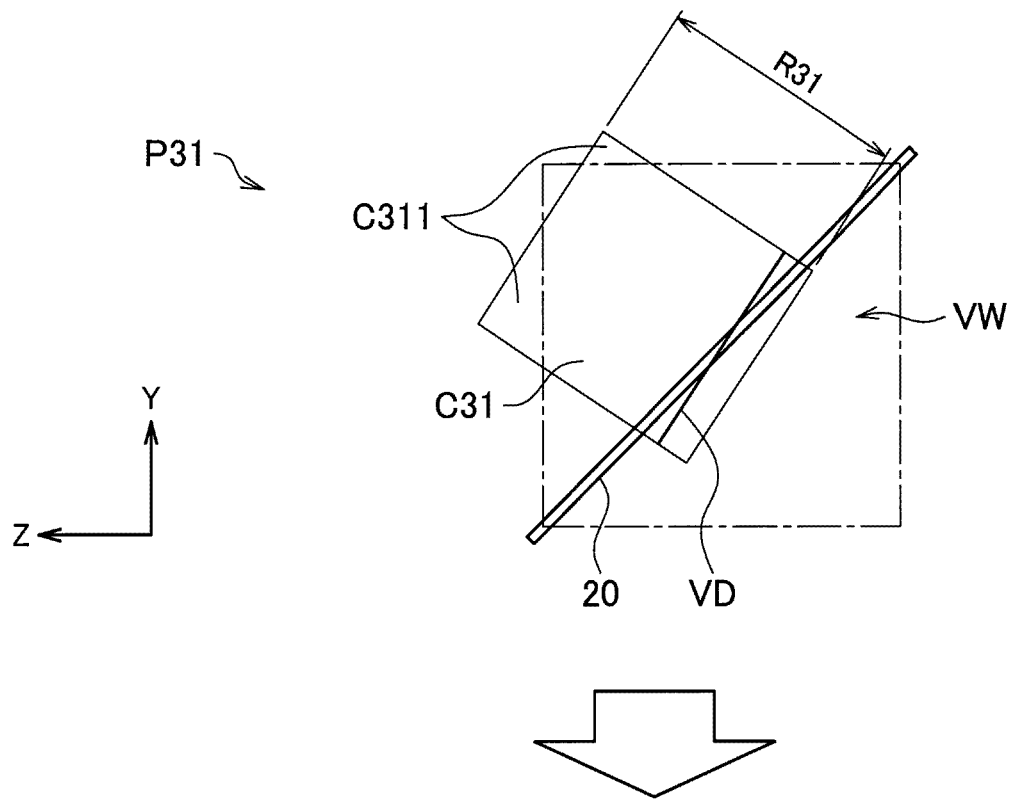
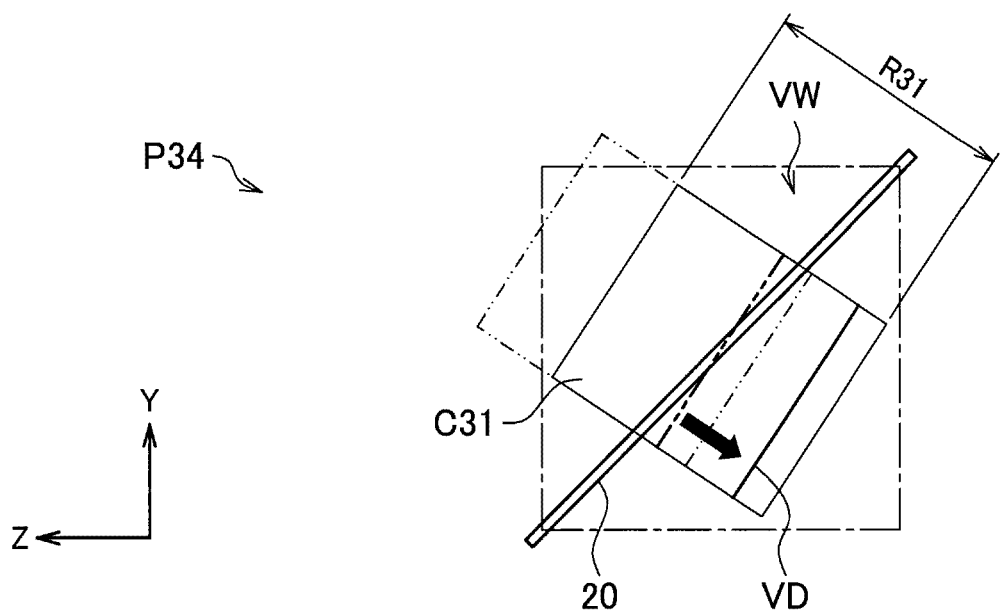

FIG. 13
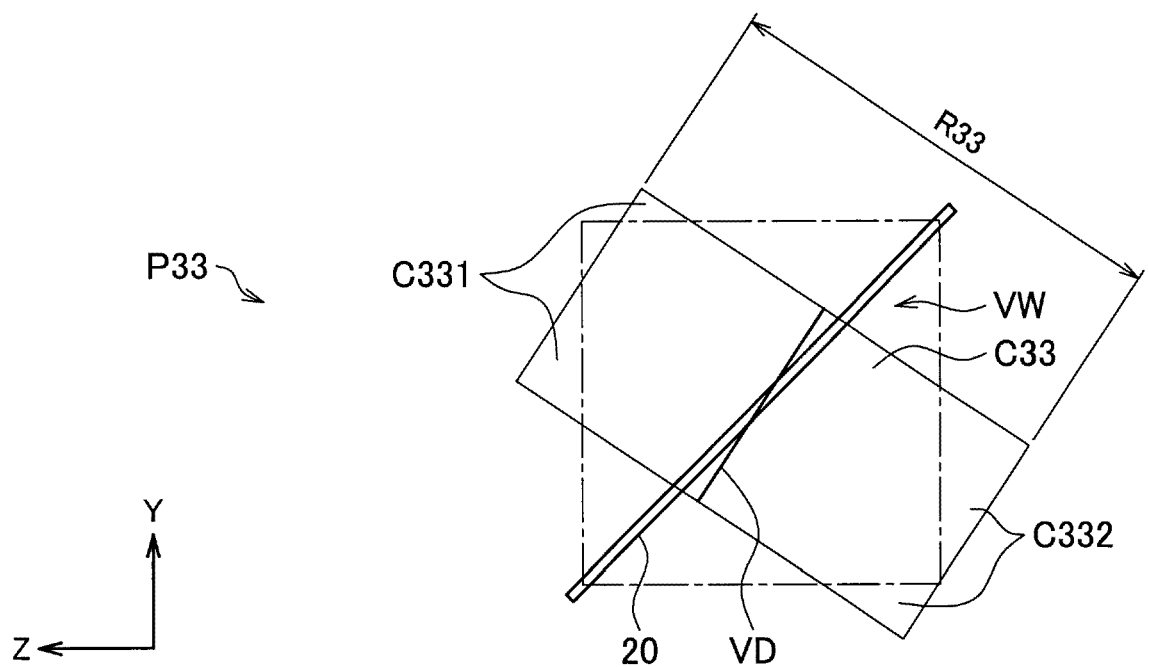
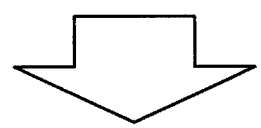
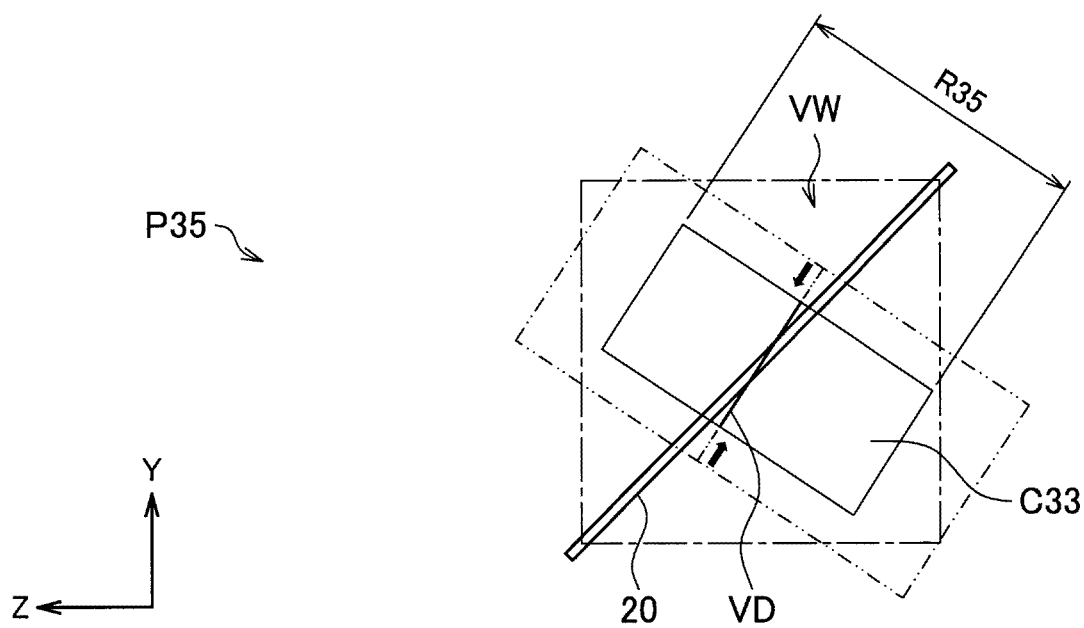

FIG. 16
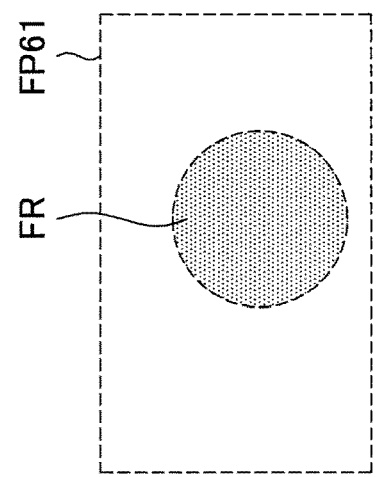
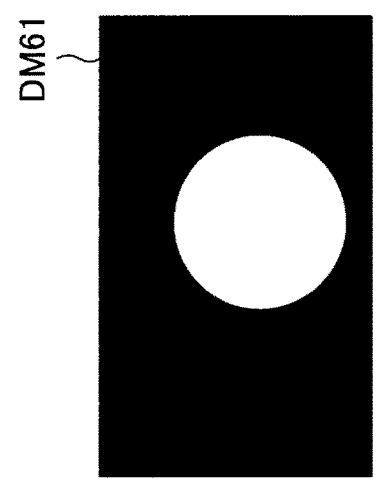
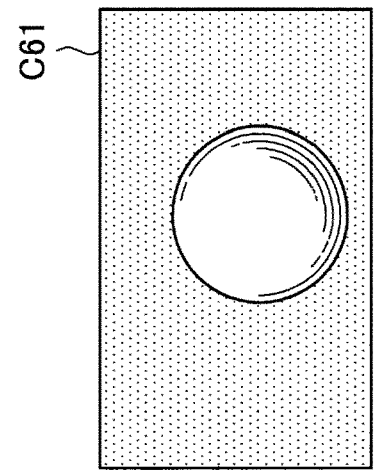

FIG. 22
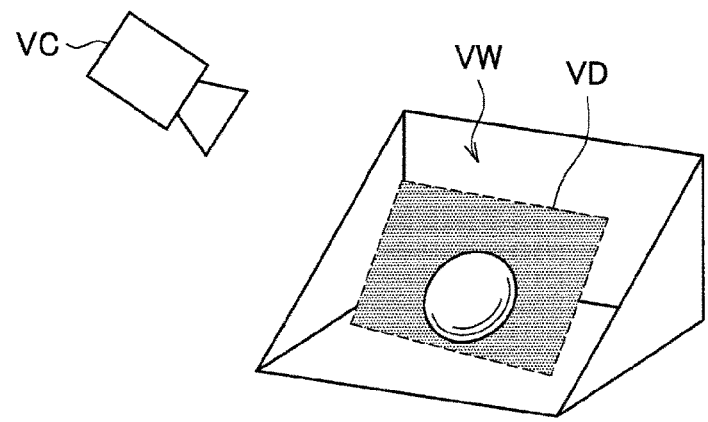
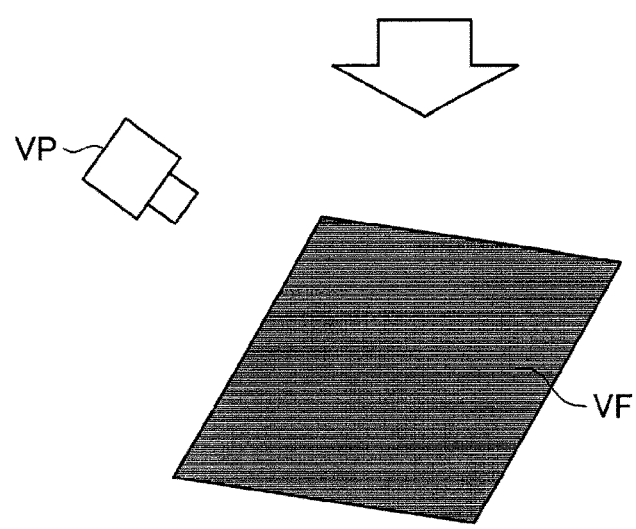
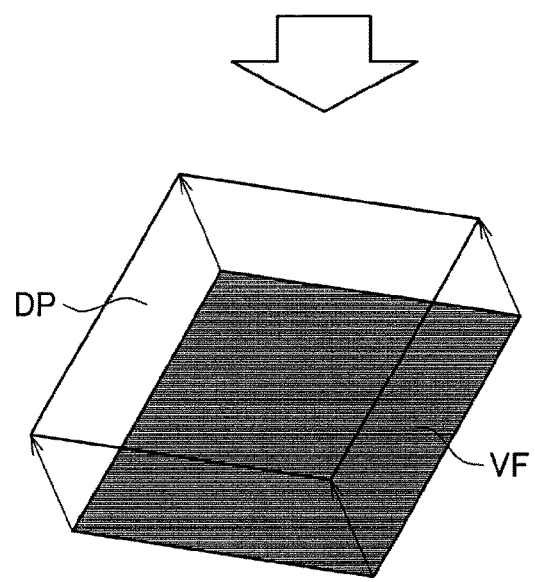

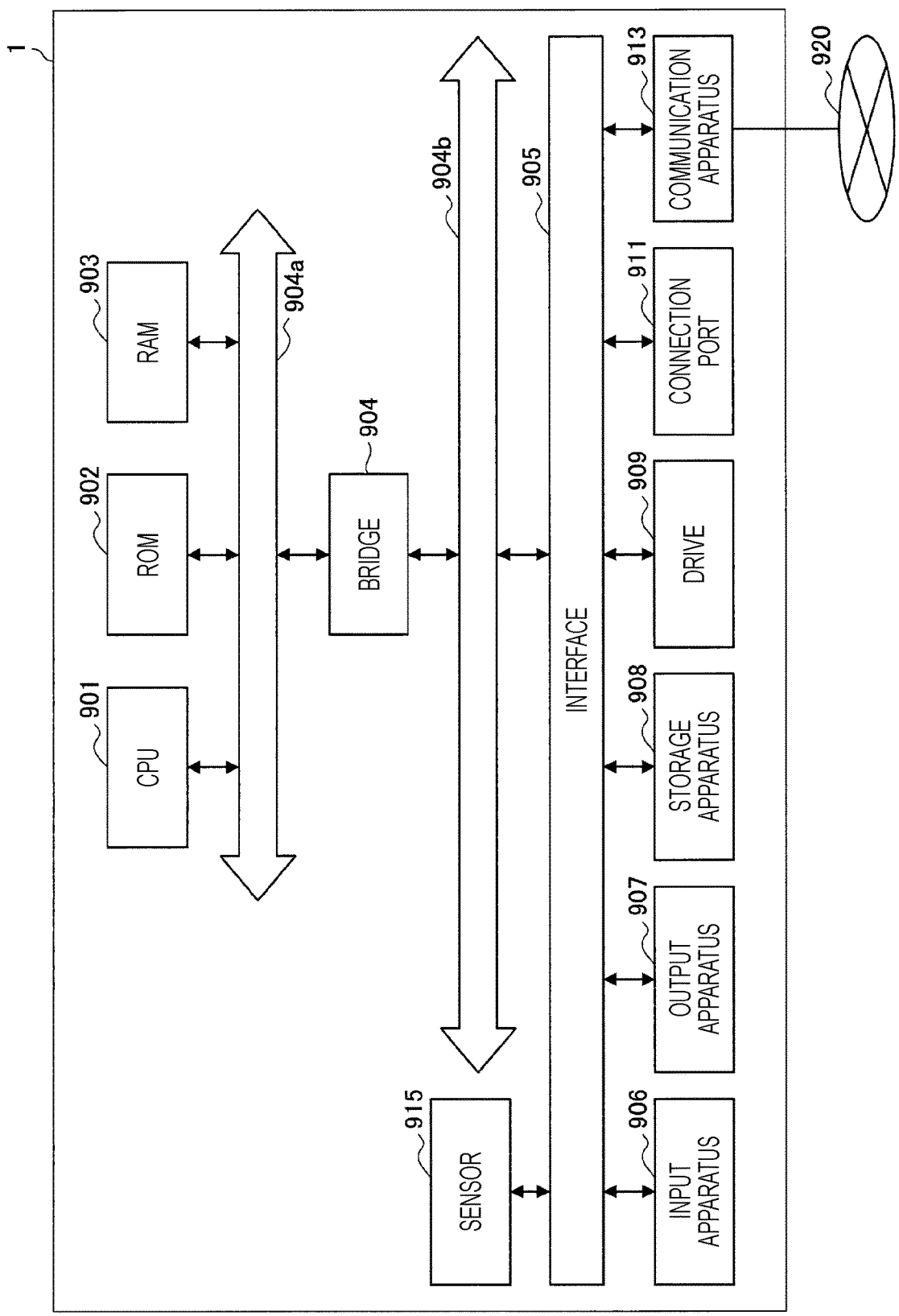

INFORMATION PROCESSING APPARATUS, INFORMATION PROCESSING METHOD, AND PROGRAM FOR DISPLAY CONTROL TO ARRANGE VIRTUAL DISPLAY BASED ON USER VIEWPOINT

CROSS REFERENCE TO PRIOR APPLICATION

This application is a National Stage Patent Application of PCT International Patent Application No. PCT/JP2018/026126 (filed on Jul. 11, 2018) under 35 U.S.C. § 371, which claims priority to Japanese Patent Application No. 2017-164193 (filed on Aug. 29, 2017), which are all hereby incorporated by reference in their entirety.

TECHNICAL FIELD

The present disclosure relates to an information processing apparatus, an information processing method, and a program.

BACKGROUND ART

In recent years, stereoscopic image display technology capable of displaying content in a stereoscopic manner is becoming widespread. For example, it is possible to give a binocular parallax to a user by shifting a right-eye image and a left-eye image on a display in a horizontal direction when displaying, and to display content at an arbitrary distance in a depth direction.

In stereoscopic image display technologies, is addition to the approach of wearing dedicated glasses and viewing the display, and the approach of wearing a dedicated apparatus in which different displays are individually disposed in front of the left and right eyes, an approach that does not require the user to wear glasses or an apparatus has been proposed, as disclosed in Patent Document 1 below.

CITATION LIST

Patent Document

Patent Document 1: Japanese Patent Application Laid-Open No. 2015-012560

SUMMARY OF THE INVENTION

Problems to be Solved by the Invention

However, since the user recognizes the depth using a really existing object such as a display frame as a clue, when a part that pops out to a nearer side than the screen or a part that is retracted to a farther side than the screen is displayed in the vicinity of an edge of the display surface of the display, there has been a possibility that loss of stereoscopic feeling and sickness are caused.

Therefore, the present disclosure proposes new and improved information processing apparatus, information processing method, and program capable of suppressing loss of stereoscopic feeling or the occurrence of sickness.

Solutions to Problems

According to the present disclosure, an information processing apparatus is provided, the information processing apparatus including a display control unit that controls display of a display unit such that a stereoscopic image is displayed on a virtual display surface arranged in a space, is which the display control unit controls an arrangement of the virtual display surface in the space on the basis of a position of a viewpoint of a user.

Furthermore, according to the present disclosure, an information processing method is provided, the information processing method including controlling, by a processor, display of a display unit such that a stereoscopic image is displayed on a virtual display surface arranged in a space, in which an arrangement of the virtual display surface in the space is controlled on the basis of a position of a viewpoint of a user.

In addition, according to the present disclosure, a program is provided, the program causing a computer to implement a display control function that controls display of a display unit such that a stereoscopic image is displayed on a virtual display surface arranged in a space, in which the display control function controls an arrangement of the virtual display surface in the space on the basis of a position of a viewpoint of a user.

Effects of the Invention

As described above, according to the present disclosure, it is possible to suppress loss of stereoscopic feeling or the occurrence of sickness.

Note that the above-mentioned effect is not necessarily limited, and any effects indicated in the present description or other effects that can be learned from the present description may be exhibited together with the above-mentioned effect or instead of the above-mentioned effect.

BRIEF DESCRIPTION OF DRAWINGS

FIG. 8 is an explanatory diagram for explaining a first display control example.

FIG. 9 is an explanatory diagram for explaining the first display control example.

FIG. 12 is an explanatory diagram for explaining a third display control example.

FIG. 13 is an explanatory diagram for explaining the third display control example.

FIG. 16 is an explanatory diagram for explaining a sixth display control example.

FIG. 22 is an explanatory diagram for explaining a second modification.

FIG. 23 is an explanatory diagram illustrating a hardware configuration example.

MODE FOR CARRYING OUT THE INVENTION

Figure 1:
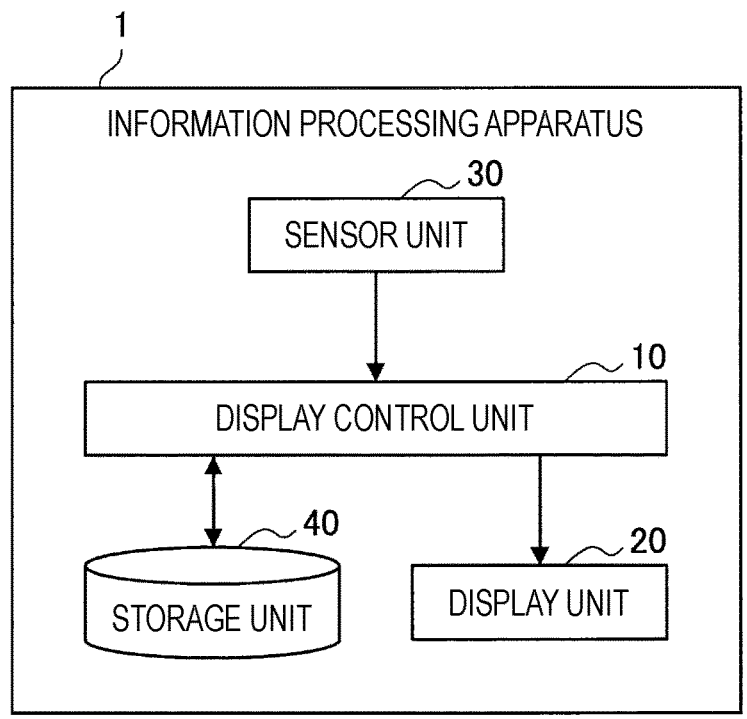
FIG. 1 is a block diagram illustrating a configuration example of an information processing apparatus 1 according to an embodiment of the present disclosure.

Hereinafter, favorable embodiments of the present disclosure will be described fa detail with reference to the accompanying drawings. Note that, in the present description and the drawings, constituent elements having substantially the same functional configuration will be denoted by the same reference numeral and redundant description will be omitted.

In addition, the description will be given in the following order,

<<1. Overview>>
<1-1. Background>
<1-2. Schematic Configuration>
<<2. Specific Examples of Display Unit and Basic Display Control>>
<<3. Details of Display Control Unit>>
<3-1. Display Control relating to Virtual Display Surface>
<3-2. Configuration Example of Display Control Unit>
<<4. Action Example>>
<<5. Modifications>>
<5-1. First Modification>
<5-2. Second Modification>
<5-3. Third Modification>
<<6. Hardware Configuration Example>>
<<7. Conclusion>>
<<1. Overview>>
<1-1. Background>

In describing embodiments of the present disclosure, the background that led to the creation of the embodiments of the present disclosure will be described first.

So-called stereo content (an example of a stereoscopic image) including a left-eye image and a right-eye image shifted in the horizontal direction is displayed so as to be observed by the user's left eye and right eye, respectively. The user can perceive the depth owing to binocular parallax. (sometimes simply referred to as parallax), which is a shift between the left-eye image and the right-eye image.

A variety of technologies has been developed to display different images (the left-eye image and the right-eye image) for the left eye and right eye of the user, respectively. For example, there are the approach of wearing dedicated glasses and viewing the display, the approach of wearing a dedicated apparatus in which different displays are individually disposed in front of the left and right eyes, and the approach that can display different images for the left and right eyes of the user not wearing glasses or an apparatus.

In a case where the stereo content is displayed on a display in this manner, loss of stereoscopic feeling and sickness are known to be caused when a part that pops out to a nearer side than the screen (the display surface of the display) or a part that is retracted to a farther side than the display is present in the vicinity of an edge of the screen and overlaps the edge of the screen. Such a phenomenon occurs due to suppression of the binocular parallax inherent in the stereo content because the user recognizes the depth using a really existing display frame (hereinafter also referred to as a screen frame) as a clue. Furthermore, since the stereo content can be seen as if the stereo content sticks to the screen frame, such a phenomenon is called a sticking effect (or a frame effect).

In order to suppress the influence of such a sticking effect, a transparent display is also used. However, since the user recognizes the original binocular parallax of the display plane at an edge portion of the stereo content, the user feels as if the binocular parallax included in the stereo content has abruptly disappeared, and a similar sticking effect is caused in some cases. As a result, there has likewise been a possibility of loss of stereoscopic feeling or the occurrence of sickness.

Therefore, the present embodiments have been created with the above circumstances taken into account. According to the present embodiments, by controlling display such that a stereoscopic image is displayed on a virtually prepared display surface (virtual display surface) arranged in a space, the influence of the sticking effect can be suppressed, and loss of stereoscopic feeling or the occurrence of sickness can be suppressed. Hereinafter, the configuration of an information processing apparatus according to the present embodiments will be described.

1-2. Schematic Configuration

FIG. 1 is a block diagram illustrating a configuration example of an information processing apparatus 1 according to an embodiment of the present disclosure. As illustrated in FIG. 1, the information processing apparatus 1 includes a display control unit 10, a display unit 20, a sensor unit 30, and a storage unit 40.

The display control unit 10 has a display control function that controls the display of the display unit 20. More specifically, the display control unit 10 controls the display of the display unit 20 such that stereo content is displayed on a virtual display surface arranged in a virtual space or a real space. The stereo content may be acquired from the storage unit 40, for example. The virtual display surface will be described later with reference to FIG. 7 and other figures.

The display unit 20 performs display in accordance with the control of the display control unit 10. The display unit 20 according to the present embodiment is a display apparatus that at least can perform stereoscopic display such that different images are presented to the left and right eyes of the user. An example of the display unit 20 to which the present embodiment can be applied will be described later with reference to FIGS. 2 to 6.

The sensor unit 30 has a function of acquiring (sensing) various types of information regarding the user or the surrounding environment, and includes at least a sensor for detecting the position of the viewpoint of the user. The sensor unit 30 may by itself detect the position of the viewpoint of the user and output information regarding the position of the viewpoint of the user to the display control unit 10, or may output information for detecting the position of the viewpoint of the user to the display control unit 10.

For example, in a case where the information processing apparatus 1 is fixed in a real space, the sensor for detecting the position of the viewpoint of the user may be an imaging unit that images the direction of the user. Furthermore, as will be described later, in a case where the information processing apparatus 1 is an apparatus worn by the user and moves, the sensor for detecting the position of the viewpoint of the user may be any of an acceleration sensor, a gyro sensor, a direction sensor, and an imaging unit, or a combination of the above sensors.

In addition, the sensor unit 30 may further include an imaging unit arranged so as to image a region corresponding to the field of view of the user in the real space.

The storage unit 40 stores programs and parameters for the above-described display control unit 10 to execute each function. Furthermore, the storage unit 40 may store stereo content to be displayed by the display control unit 10 and information regarding the virtual space.

The schematic configuration of the information processing apparatus 1 has been described above. Note that the configuration illustrated in FIG. 1 is an example, and the present technology is not limited to such an example. For example, the display control unit 10 may control the display of a display unit provided outside the information processing apparatus 1. In addition, the display control unit 10 may control the display such that stereo content acquired from another apparatus is displayed on the virtual display surface via a communication unit (not illustrated). Meanwhile, the information processing apparatus 1 may not include the sensor unit, and the information described above may be transmitted to the information processing apparatus 1 from a sensor installed outside the information processing apparatus 1.

2. Specific Examples of Display Unit and Basic Display Control

Subsequently, specific examples of the display unit 20 described with reference to FIG. 1 and basic display control by the display control unit 10 will be described with reference to FIGS. 2 to 7.

Figure 2:
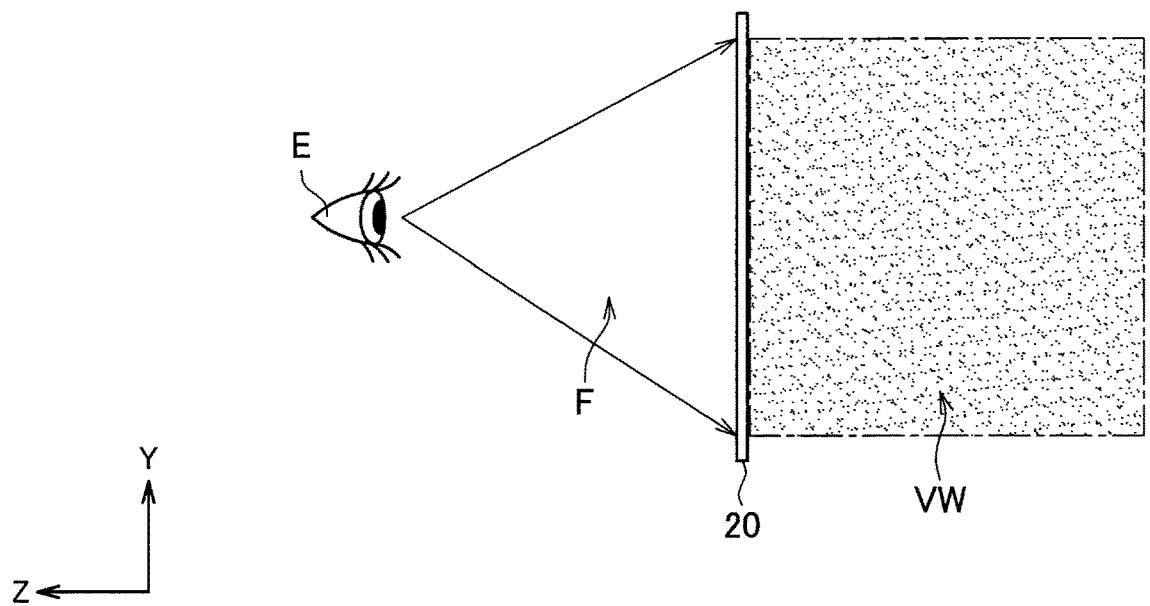
FIG. 2 is an explanatory diagram illustrating an example of a display unit 20 according to the embodiment.
Figure 3:
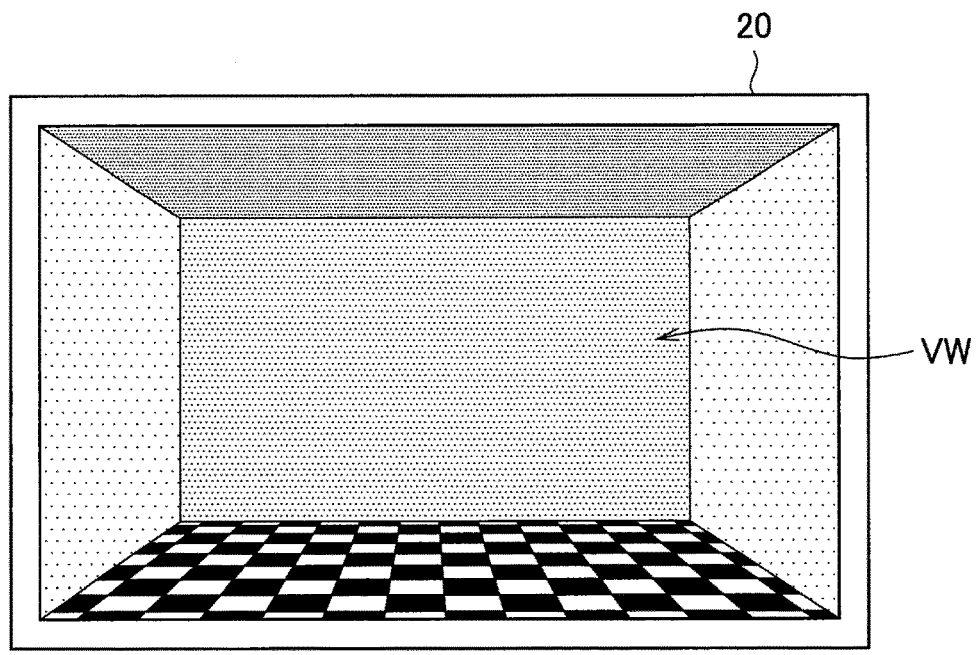
FIG. 3 is an explanatory diagram illustrating an example of the display unit 20 according to the embodiment.

FIGS. 2 and 3 are explanatory diagrams illustrating an example of the display unit 20 according to the present embodiment. As illustrated in FIG. 2, the display unit 20 may be fixedly arranged such that the display surface of the display unit 20 is vertical to a horizontal plane in the real space. In such a case, for example, the display control unit 10 may arrange a virtual space VW on an opposite side as viewed from a viewpoint E of the user, that is, on a far side of the display unit 20, and display the virtual space VW on the display unit 20. FIG. 3 illustrates an example of a field of view F of the user viewed from the viewpoint E of the user illustrated in FIG. 2. As illustrated in FIG. 3, the virtual space VW is displayed on the display unit 20. The virtual space VW may be displayed as if the virtual space VW exists beyond the window, or may be displayed as the contents of a box as if the sides of the box are formed by the frame of the display unit 20.

Figure 4:
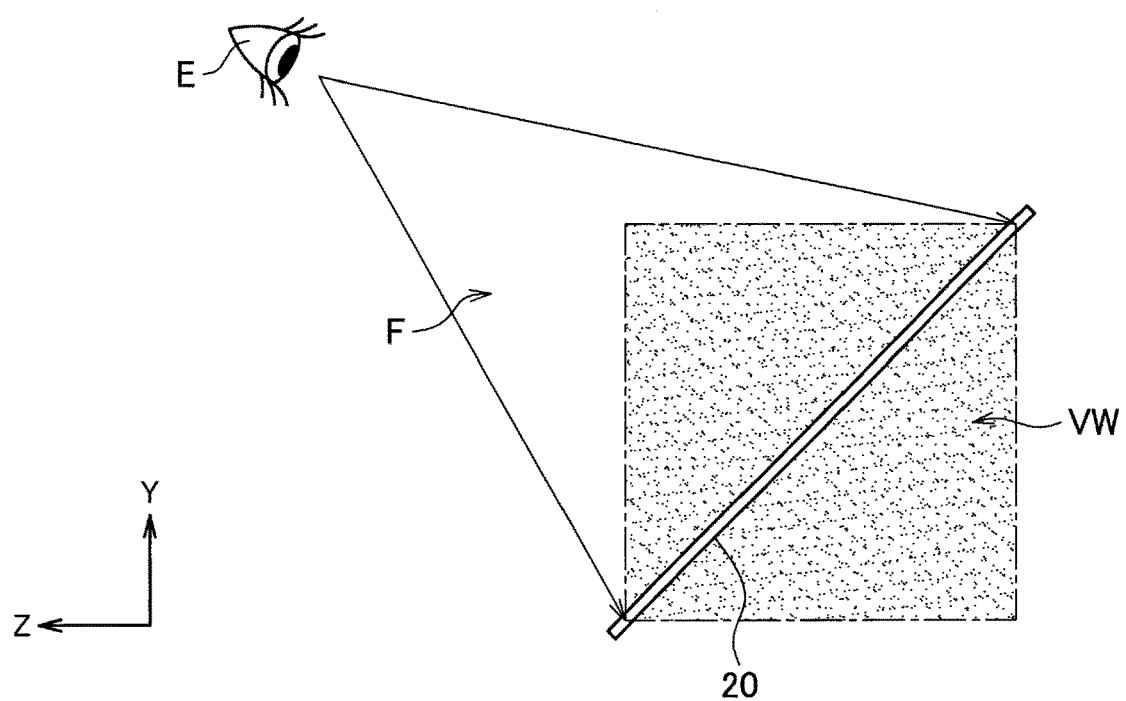
FIG. 4 is an explanatory diagram illustrating another example of the display unit 20 according to the embodiment.
Figure 5:
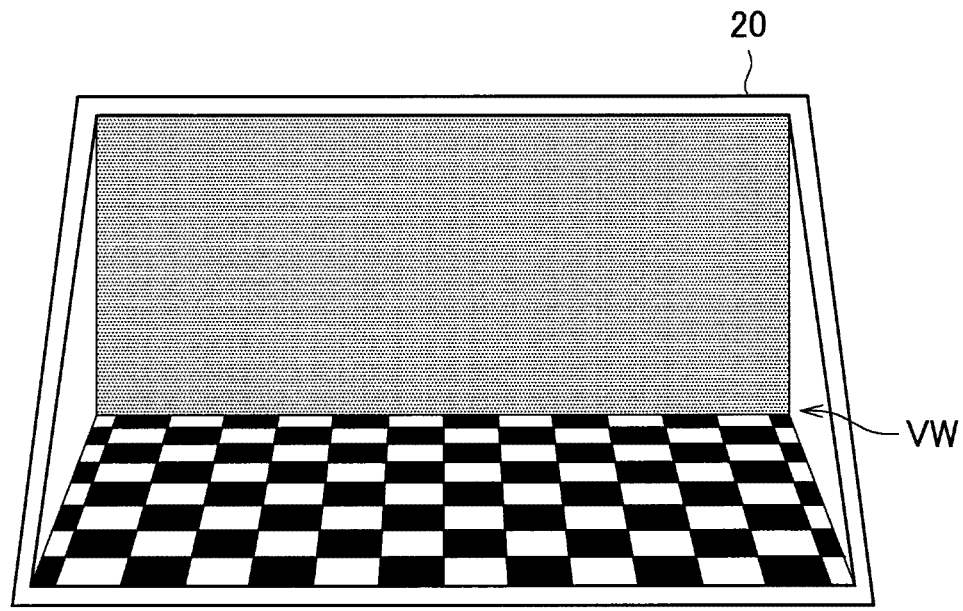
FIG. 5 is an explanatory diagram illustrating another example of the display unit 20 according to the embodiment.

FIGS. 4 and 5 are explanatory diagrams illustrating another example of the display unit 20 according to the present embodiment. As illustrated in FIG. 4, the display unit 20 may be fixedly arranged such that the display surface of the display unit 20 is inclined (non-vertical) with respect to the horizontal plane in the real space. In such a case, the display control unit 10 may arrange the virtual space VW such that the virtual space VW intersects the display surface of the display unit 20 as illustrated in FIG. 4, that is, the virtual space VW has regions on both of a near side and a far side of the display unit 20, and display the virtual space VW on the display unit 20. FIG. 5 illustrates an example of the field of view F of the user viewed from the viewpoint E of the user illustrated in FIG. 4. As illustrated in FIG. 5, the virtual space VW is displayed on the display unit 20.

Note that, in FIG. 5, the virtual space VW is displayed only on the far side of the display unit 20; however, the display control unit 10 may arrange a virtual object on the near side of the display unit 20 in the virtual space, and display the virtual space VW such that the virtual object is observed on the near side of the display unit 20. Furthermore, as will be described later, the display control unit 10 may arrange a virtual object such that the virtual object intersects the display surface of the display unit 20.

Figure 6:
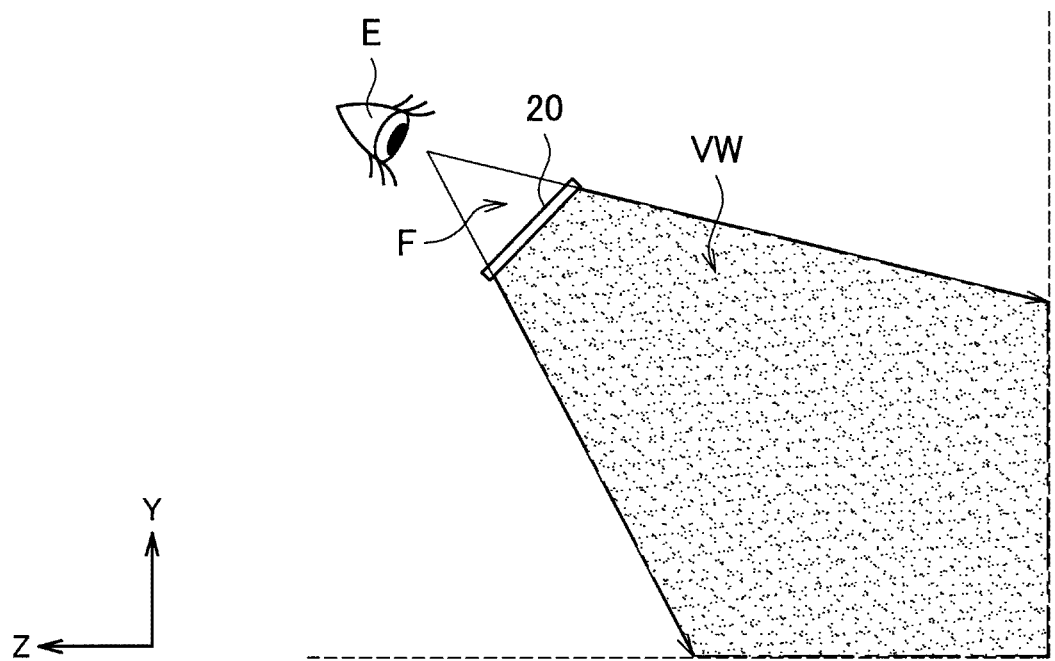
FIG. 6 is an explanatory diagram illustrating another example of the display unit 20 according to the embodiment.

FIG. 6 is an explanatory diagram illustrating another example of the display unit 20 according to the present embodiment. In the example illustrated in FIG. 6, the information processing apparatus 1 is a wearable apparatus worn by the user, and the display unit 20 is positioned in front of the user's eyes when the user wears the information processing apparatus 1. In the example illustrated in FIG. 6, the information processing apparatus 1 may be, for example, a glasses-type head mounted display (HMD) to be mounted on the head and, in such a case, the display unit 20 corresponds to glasses lens parts. Note that the information processing apparatus 1 may be an HMD of a headband type (a type of being worn with a band that goes around the entire circumference of the head; a band passing through the top of the head as well as the temporal heads is provided in some cases), or may be an HMD of a helmet type (a helmet visor part corresponds to the display unit 20).

In the example illustrated in FIG. 6, for example, the display control unit 10 may arrange the virtual space VW on an opposite side as viewed from the viewpoint E of the user, that is, on a far side of the display unit 20, and display the virtual space VW on the display unit 20. Furthermore, as illustrated in FIG. 6, the display unit 20 may cover the field of view F of the user and, in such a case, the user can obtain an immersion feeling as if the user exists in the virtual space VW.

In addition, the display control unit 10 may arrange the virtual space VW on the basis of the real space or may arrange the virtual space VW independently of the real space. For example, as illustrated in FIG. 6, by matching the wall and floor (or ground) of the real space with the wall and floor (or ground) of the virtual space VW.

Additionally, as in the example illustrated in FIG. 6, in a case where the information processing apparatus 1 is a wearable apparatus worn by the user, the display control unit 10 may specify the position of the viewpoint of the user on the basis of information acquired by the sensor unit 30, and control the display such that the virtual space VW is localized. Since the display control method for ensuring that the virtual space VW is localized can be implemented by a well-known technology, a detailed description thereof will be omitted here.

Figure 7:
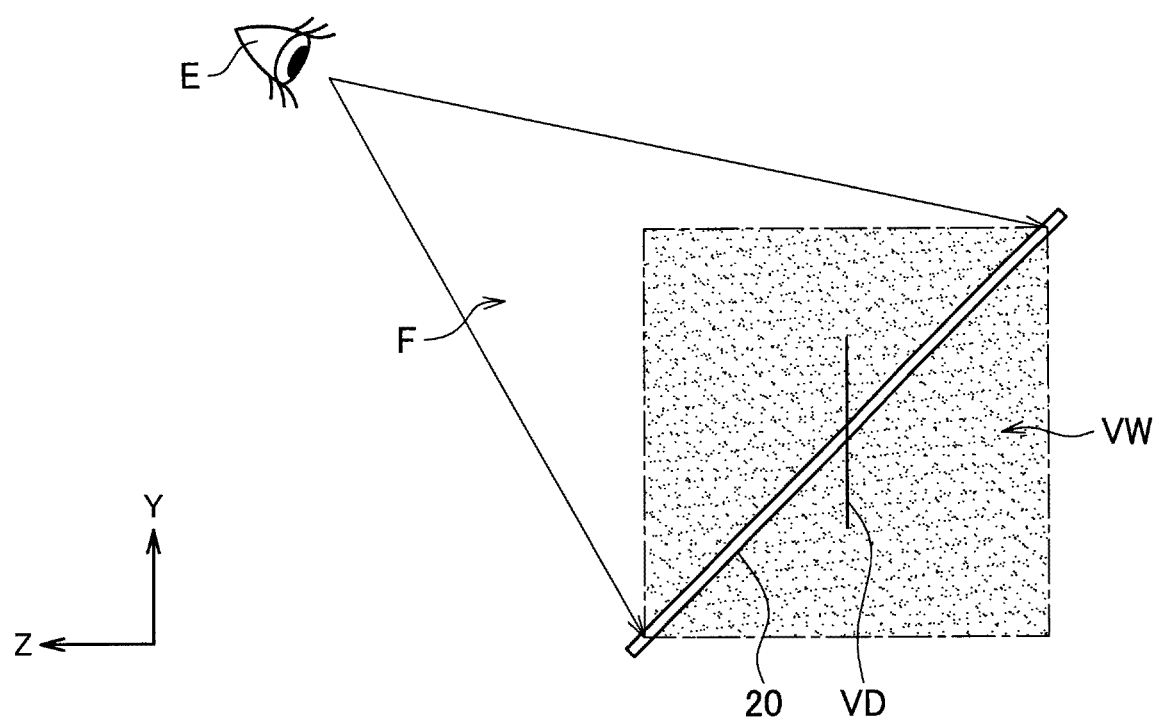
FIG. 7 is an explanatory diagram illustrating an example of a virtual display surface VD displayed by a display control unit 10.

The display control unit 10 may arrange a virtual display surface, which is a virtually prepared display surface, in the virtual space VW arranged with respect to the display unit 20 as illustrated in FIGS. 2 to 6, and display stereo content on the virtual display surface. FIG. 7 is an explanatory diagram illustrating an example of a virtual display surface VD displayed by the display control unit 10. Note that FIG. 7 illustrates, as an example, a case where the display unit 20 is arranged such that the display surface of the display unit 20 is inclined with respect to the horizontal plane in the real space, as described with reference to FIGS. 4 and 5.

In a case where the display unit 20 is arranged as illustrated in FIG. 7, the display control unit 10 may arrange the virtual display surface VD such that the virtual display surface VD intersects the display surface of the display unit 20. Owing to such a configuration, the user can obtain both of a stereoscopic feeling in a pop-out direction (near direction) and a stereoscopic feeling in a retraction direction (far direction) on the virtual display surface VD. As a result, there is an effect that sufficient stereoscopic feeling can be easily obtained with a smaller amount of parallax.

The virtual display surface VD may be arranged in the virtual space VW as a virtual object having a planar shape, for example. Then, the display control unit 10 displays the stereo content on the virtual display surface VD. The virtual display surface VD is observed by the user as if a planar stereoscopic image display apparatus having no frame is arranged. As described above, the virtual display surface VD does not have a frame unlike a really existing display, such that the influence of the sticking effect described above is suppressed, and loss of stereoscopic feeling or the occurrence of sickness can be suppressed.

Note that, in the above, a case where the display unit 20 is arranged such that the display surface of the display unit 20 is inclined with respect to the horizontal plane in the real space has been described as an example; however, in the examples of the display unit 20 as described with reference to FIGS. 2, 3, and 6, the display control unit 10 similarly can arrange the virtual display surface in the virtual space VW and display the stereo content on the virtual display surface. Furthermore, in the following, a case where the display unit 20 is arranged such that the display surface of the display unit 20 is inclined with respect to the horizontal plane in the real space will be described as an example, but the other cases can apply similarly.

In addition, FIGS. 2 to 7 illustrate an example in which the display control unit 10 displays the virtual space VW on the display unit 20; however, the present technology is not limited to such an example. In a case where the display unit 20 has an optical transmissive property, the display control unit 10 may not display the virtual space VW. In such a case, the display control unit 10 arranges the virtual display surface VD in the real space instead of the virtual space VW described above, and controls the display of the display unit 20 as if the virtual display surface VD exists in the real space. Additionally, in a case where the sensor unit 30 described later has an imaging unit that images a line-of-sight direction of the user, the display control unit 10 may arrange the virtual display surface VD in the real space displayed on the display unit 20, on the basis of an image acquired by imaging of such an imaging unit.

Note that, in a case where the display control unit 10 arranges the virtual display surface VD in the real space in this manner, the display unit 20 may be arranged as illustrated in FIGS. 2 and 3, or arranged as illustrated in FIGS. 4 and 5, or arranged as illustrated in FIG. 6. In a case where the display control unit 10 arranges the virtual display surface VD in the real space and the information processing apparatus 1 is an HMD as illustrated in FIG. 6, the virtual display surface VD may be displayed so as to be localized in the real space as long as the arrangement of the virtual display surface VD is not altered. Display control for ensuring that the virtual display surface VD is localized in the real space is implemented using, for example, the position of the viewpoint of the user specified on the basis of information acquired by the sensor unit 30.

3. Details of Display Control Unit

The specific examples of the display unit 20 and the basic display control by the display control unit 10 have been described above. As described above, the display control unit 10 arranges the virtual display surface in the virtual space or the real space, and controls the display of the display unit 20 such that the stereo content is displayed on the arranged virtual display surface.

The display control unit 10 according to the present embodiment performs further display control relating to the virtual display surface VD (including display control based on the stereo content displayed on the virtual display surface VD), thereby being able to obtain the effect of enhancing the stereoscopic feeling or suppressing the occurrence of sickness. Hereinafter, some examples of display control relating to the virtual display surface by the display control unit 10 and an example of the configuration of the display control unit 10 for implementing such display control will be described.

Note that, in the following, a case where the display unit 20 is arranged such that the display surface of the display unit 20 is inclined with respect to the horizontal plane in the real space will be mainly described as an example, as in the examples illustrated in FIGS. 3, 4, and 7. However, unless otherwise mentioned, the display control described below can also be applied similarly to the examples of the display unit 20 described with reference to FIGS. 2, 3, and 6. Furthermore, in the following, an example in which the display control unit 10 displays the virtual space VW and the virtual display surface VD is arranged in the virtual space VW will be mainly described, and an example in which the virtual display surface is arranged in the real space will be described later as modifications.

In addition, all of the display control examples relating to the virtual display surface described below may not be implemented at the same time, and the display control unit 10 may not have a function for performing some types of display control among the display control examples described below.

3-1. Display Control Examples Relating to Virtual Display Surface

First Display Control Example

Initially, a first display control example relating to the virtual display surface (hereinafter also simply referred to as a first display control example) will be described. In a case where the stereo content is displayed on a fixed display fixed in the real space, a range in which the user can comfortably observe the displayed stereo content is limited. For example, the user can feel the stereoscopic feeling included in the stereo content exactly when observing the stereo content from the direct front of the fixed display and can comfortably perform observation; however, when observing the stereo content from a position shifted from the direct front, the user sometimes performs observation with distorted binocular parallax or reverse viewing, in which case there is a possibility that fatigue and sickness are caused.

When the virtual display surface VD is fixedly arranged in the real space, a difficulty similar to that described above can be caused. For example, in a case where the arrangement of the virtual display surface VD with respect to the display unit 20 fixedly arranged in the real space is fixed, as illustrated in FIGS. 2 to 5, or in a case where the virtual display surface VD is displayed so as to be localized in the example illustrated in FIG. 6, the virtual display surface VD is fixedly arranged in the real space.

Therefore, the display control unit 10 may control the arrangement of the virtual display surface VD in the virtual space VW on the basis of the position of the viewpoint of the user. Note that, in the present description, "controlling the arrangement of the virtual display surface" includes controlling at least one of the position, orientation (angle), or size of the virtual display surface in a space where the virtual display surface is arranged.

In the following, an example in which the display control unit 10 controls the arrangement of the virtual display surface VD such that a straight line linking the viewpoint of the user and the center point of the virtual display surface VD (hereinafter referred to as the line of sight of the user) satisfies a predetermined condition concerning a relationship with the virtual display surface will be described as the first display control example. FIGS. 8 and 9 are explanatory diagrams for explaining the first display control example. Note that, in FIG. 8 and subsequent figures, hatching indicating the virtual space VW is omitted in order to prioritize visibility.

The predetermined condition concerning the relationship between the line of sight of the user and the virtual display surface VD may be a condition relating to an angle defined by the line of sight of the user and the virtual display surface VD, For example, in the example illustrated in FIG. 8, the display control unit 10 controls the orientation of the virtual display surface VD so as to satisfy a condition that the virtual display surface VD and a straight line linking the viewpoint E of the user and a center point VDC of the virtual display surface VD forms a vertical angle.

FIG. 8 is a diagram of the display unit 20 viewed from a lateral direction, similarly to the example illustrated in FIG. 4. As illustrated in FIG. 8, at certain time T11, a line of sight G11 of the user and the virtual display surface VD are vertical. In a case where the position of the viewpoint E of the user changes, the virtual display surface VD rotates according to the position of the viewpoint E of the user and, at time T12 illustrated in FIG. 8, the virtual display surface VD is arranged so as to be vertical to a line of sight G12 of the user. That is, the display control unit 10 controls (rotates) the orientation (angle) of the virtual display surface VD such that the virtual display surface VD is vertical to the user's line of sight according to the user's viewpoint movement in the horizontal direction in the real space.

FIG. 9 is a plan view of the display unit 20 viewed from directly above, that is, against a Y-axis direction illustrated in FIG. 8. As illustrated in FIG. 9, at certain time T13, a line of sight G13 of the user and the virtual display surface VD are vertical. In a case where the position of the viewpoint E of the user changes, the virtual display surface VD rotates according to the position of the viewpoint E of the user and, at time T14 illustrated in FIG. 9, the virtual display surface VD is arranged so as to be vertical to a line of sight G12 of the time user. That is, the display control unit 10 controls (rotates) the orientation of the virtual display surface VD such that the virtual display surface VD is vertical to the user's line of sight according to the user's viewpoint movement in the vertical direction in the real space.

According to the first display control example described above, the user always feels as if a stereoscopic display apparatus that makes a motion so as to face straight the user exists in the virtual space. That is, as described above, by controlling the orientation of the virtual display surface VD, the user is put into a state of always observing the stereo content from the direct front of the virtual display surface VD, and can always observe the stereo content comfortably.

Note that, in the above, an example in which the orientation of the virtual display surface VD is controlled such that the user's line of sight and the virtual display surface VD forms a vertical angle has been described; however, the present embodiment is not limited to such an example. For example, the virtual display surface VD may not always be vertical to the user's line of sight, and an angle defined by the virtual display surface VD and the user's line of sight may be within a predetermined range including vertical. In such a case, for example, the predetermined condition may be that an angle defined by the user's line of sight and the virtual display surface VD falls within a predetermined range including vertical. Moreover, in such a case, the display control unit 10 may not alter the orientation of the virtual display surface VD while the angle defined by the user's line of sight and the virtual display surface VD is contained within a predetermined range. Owing to such a configuration, for example, a sense of incongruity due to frequent changes in the orientation of the virtual display surface VD can be reduced.

Furthermore, in order to satisfy the predetermined condition, the display control unit 10 may control the position or size of the virtual display surface VD instead of controlling the orientation of the virtual display surface VD. For example, the display control unit 10 can maintain an angle defined by the user's line of sight and the virtual display surface VD vertical, by moving the position of the virtual display surface VD. In addition, the display control unit 10 may satisfy the predetermined condition by combining a plurality of types of control from among the control of the position, the control of the orientation, and the control of the size of the virtual display surface VD.

Second Display Control Example

Subsequently, a second display control example relating to the virtual display surface (hereinafter also simply referred to as a second display control example) will be described. As described above, by displaying the stereo content on the virtual display surface VD arranged in the virtual space VW, it is possible to suppress the sticking effect involved in the presence of the screen frame. However, there is a possibility that a sticking effect involved in a sudden disappearance of binocular parallax occurs at an edge portion of the stereo content.

Figure 10:
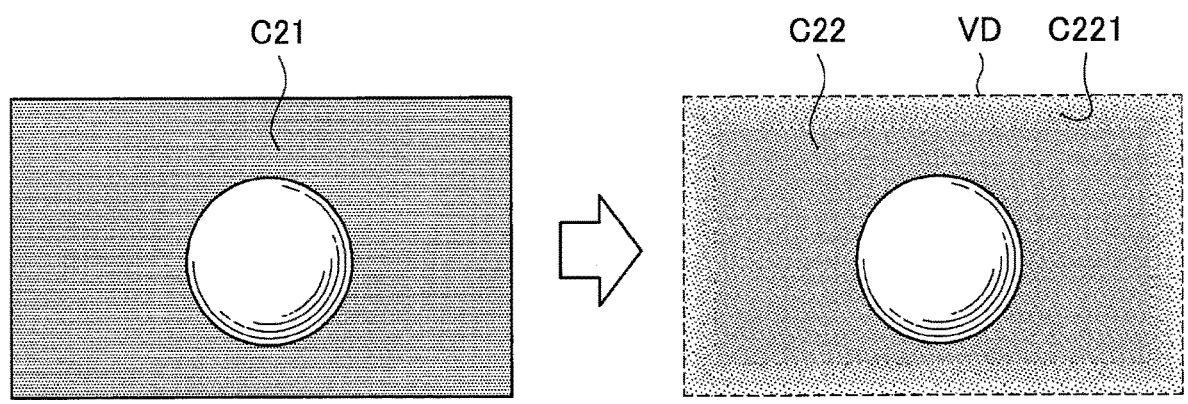
FIG. 10 is an explanatory diagram for explaining a second display control example.

Therefore, the display control unit 10 may control the transparency of the stereo content such that the transparency of a peripheral portion of the stereo content is higher than the transparency of a central portion of the stereo content. Moreover, the display control unit 10 may control the transparency of the stereo content such that the transparency becomes higher as an edge portion of the stereo content is closer. Such an example will be described as the second display control example with reference to FIG. 10. FIG. 10 is an explanatory diagram for explaining the second display control example.

For example, the display control unit 10 performs transparency control on stereo content C21 as illustrated in FIG. 10 to ensure that the transparency of a peripheral portion is higher than the transparency of a central portion, and displays stereo content C22 on the transparent virtual display surface VD. A peripheral portion C221 of the stereo content C22 illustrated in FIG. 10 has higher transparency than the transparency of a central portion of the stereo content C22, and additionally the transparency becomes higher as an edge portion of the stereo content C22 is closer. Such a change in transparency may be linear or non-linear.

In a case where the virtual display surface VD is arranged in the virtual space VW, the display control unit 10 may reflect the transparency in the display by mixing the stereo content, which is a foreground, and the virtual space VW, which is a background, with an α value according to the transparency (alpha blending) to perform merging with the virtual space VW.

The second display control described above makes it difficult for the user to feel that the binocular parallax has disappeared suddenly at an edge portion of the stereo content, and can further suppress loss of stereoscopic feeling or the occurrence of sickness.

Third Display Control Example

Figure 11:
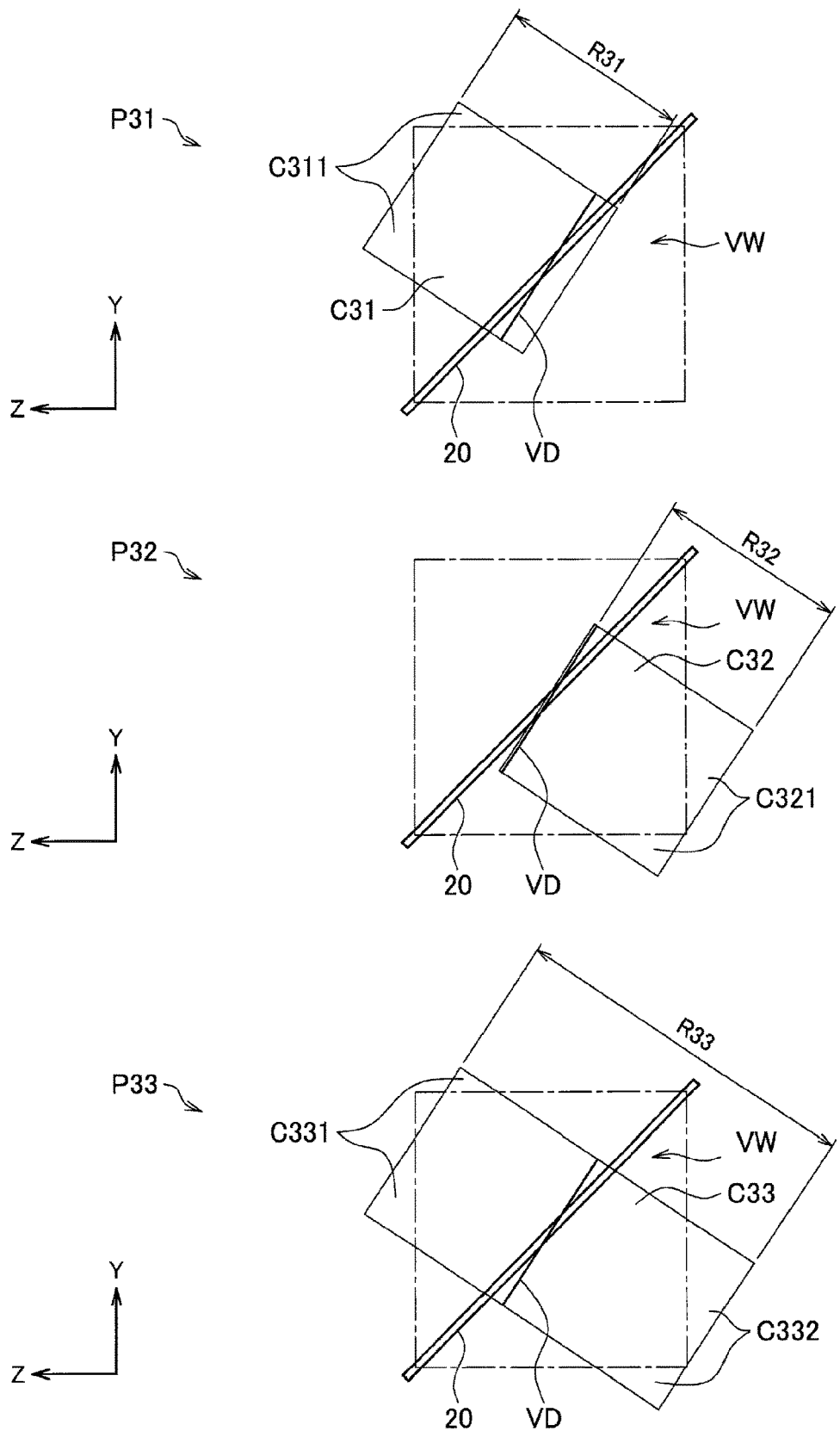
FIG. 11 is an explanatory diagram illustrating an example of parallax ranges included in stereo content.

Subsequently, a third display control example relating to the virtual display surface (hereinafter also simply referred to as a third display control example) will be described. In a case where diverse types of stereo content are to be displayed, the ranges of parallax included in these diverse types of stereo content are also diverse. FIG. 11 is an explanatory diagram illustrating an example of parallax ranges included is stereo content.

In the example of a pattern P31 illustrated in FIG. 11, stereo content C31 having a parallax range R31 is displayed on the virtual display surface VD. Since the parallax range R31 includes large parallax in the pop-out direction with respect to the position of the virtual display surface VD, in the example of the pattern P31 illustrated in FIG. 11, partial regions C311 of the stereo content C31 protrude from the virtual space VW in the pop-out direction.

Furthermore, in the example of a pattern P32 illustrated in FIG. 11, stereo content C32 having a parallax range R32 is displayed on the virtual display surface VD. Since the parallax range R32 includes large parallax in the retraction direction with respect to the position of the virtual display surface VD, in the example of the pattern P32 illustrated in FIG. 11, partial regions C321 of the stereo content C32 protrude from the virtual space VW in the retraction direction.

In addition, in the example of a pattern P33 illustrated in FIG. 11, stereo content C33 having a parallax range R33 is displayed on the virtual display surface VD. Since the parallax range R33 includes large parallax in both of the pop-out direction and the retraction direction with respect to the position of the virtual display surface VD, in the example of the pattern P33 illustrated in FIG. 11, partial regions C331 and partial regions C332 of the stereo content C32 protrude from the virtual space VW in both of the pop-out direction and the retraction direction, respectively.

In a case where the parallax in the pop-out direction, or the retraction direction, or both of the pop-out direction and the retraction direction is too large as described above, there is a possibility that the stereo content cannot be normally displayed on the virtual display surface VD arranged in the virtual space VW. In particular, in a case where the amount of pop-out, or the amount of retraction from the display unit 20, or the total of the amount of pop-out and the amount of retraction is too large, there is a possibility that a decrease in the visibility, the stereoscopic feeling, or the feeling of localization to the virtual space VW occurs.

Therefore, the display control unit 10 may control the arrangement of the virtual display surface VD on the basis of the parallax range (an example of parallax information) included in the stereo content. Such an example will be described as the third display control example with reference to FIGS. 12 and 13. FIGS. 12 and 13 are explanatory diagrams for explaining the third display control example.

FIG. 12 illustrates the pattern P31 illustrated in FIG. 11 in which the stereo content C31 is displayed. In a pattern P34 illustrated in FIG. 12, the display control unit 10 implements a proper arrangement by controlling to move the position of the virtual display surface VD in a direction of far side of the display unit 20. The display control unit 10 may control the position of the virtual display surface VD such that the parallax range R31 of the stereo content C31 is contained within the virtual space VW, for example, as in the pattern P34. Furthermore, the display control unit 10 may control the position of the virtual display surface VD such that any one of the amount of pop-out, the amount of retraction, and the total of the amount of pop-out and the amount of retraction from the display unit 20 specified from the parallax range is contained within a predetermined range.

Note that, although not illustrated, in the case of the pattern P32 illustrated in FIG. 11, the display control unit 10 may implement a proper arrangement, for example, by controlling to move the position of the virtual display surface VD in a near direction of the display unit 20.

FIG. 13 illustrates the pattern P33 illustrated in FIG. 11 in which the stereo content C33 is displayed. Since the parallax range R33 included in the stereo content C33 includes large parallax in the retraction direction with respect to the position of the virtual display surface VD, it is difficult to properly arrange the virtual display surface VD solely by moving the virtual display surface VD. Therefore, the display control unit 10 implements a proper arrangement by controlling to downsize the virtual display surface VD as in a pattern P35 illustrated in FIG. 13.

The display control unit 10 may control the size of the virtual display surface VD such that a parallax range R35 of the stereo content C33 displayed on the virtual display surface VD is contained in the virtual space VW, for example, as in the pattern P35. Furthermore, the display control unit 10 may control the size of the virtual display surface VD such that any one of the amount of pop-out, the amount of retraction, and the total of the amount of pop-out and the amount of retraction from the display unit 20 specified from the parallax range is contained within a predetermined range. Note that, as illustrated in FIG. 13, the parallax range of the stereo content C33 displayed on the virtual display surface VD can also change as the size of the virtual display surface VD changes.

According to the third display control described above, the stereo content can be displayed in a proper arrangement.

Fourth Display Control Example

Subsequently, a fourth display control example relating to the virtual display surface (hereinafter also simply referred to as a fourth display control example) will be described. In a case where the virtual display surface VD is arranged in the virtual space VW, the boundary is clearly recognized depending on the luminance difference between the virtual space VW and the stereo content displayed on the virtual display surface VD, and there is a possibility that the sense of real existence as if existing in the same space is decreased.

Figure 14:
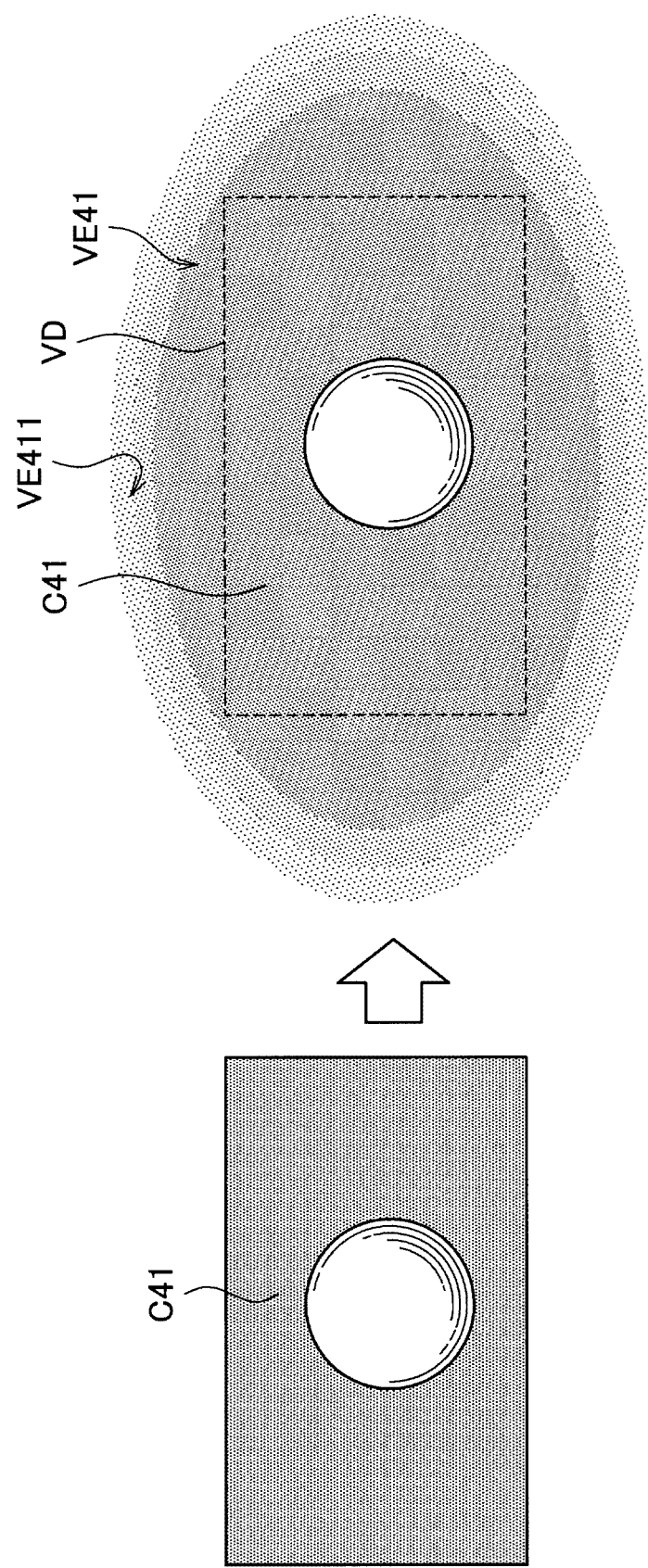
FIG. 14 is an explanatory diagram for explaining a fourth display control example.

Therefore, the display control unit 10 may control the color around the virtual display surface VD on the basis of color information regarding the stereo content. Such an example will be described as the fourth display control example with reference to FIG. 14. FIG. 14 is an explanatory diagram for explaining the fourth display control example.

The display control unit 10 displays an effect VE41 like flare around the virtual display surface VD on the basis of the color information regarding stereo content C41 as illustrated in FIG. 14, for example. The color of the effect VE41 may be designated on the basis of the color information regarding the stereo content C41, and may be a color close to the color of the stereo content. C41 or a color that can be seen as if joined to the stereo content C41. For example, for example a primary background color of the stereo content C41, an illumination light color estimated from the stereo content C41, the color of an edge portion of the stereo content C41, or the like may be used as the color of the effect VE41. Furthermore, by displaying the effect VE41 so as to increase the transparency as an outer edge portion is closer, as in a peripheral portion VE411 of the effect VE41 illustrated in FIG. 14, the joint to the space is expressed more naturally.

Note that, in a case where the virtual display surface VD is arranged in the virtual space VW, the display control unit 10 may use a computer graphics (CG) technique to control the color around the virtual display surface VD instead of displaying an effect like flare. For example, the display control unit 10 may control the color around the virtual display surface VD by controlling the color of illumination light used for drawing the virtual space VW on the basis of the color information regarding the stereo content.

According to the fourth display control described above, the joint between the space and the stereo content is naturally expressed, and a sense of real existence as if existing in the same space is obtained.

Fifth Display Control Example

Subsequently, a fifth display control example relating to the virtual display surface (hereinafter also simply referred to as a fifth display control example) will be described. In a case where the background of the stereo content displayed on the virtual display surface VD is flat, there are few clues to binocular parallax, and it is difficult for the user to feel the parallax change in such a region; accordingly, it is perceived that a plane exists in the space, and there is a possibility that the sense of depth of the stereo content is impaired.

Figure 15:
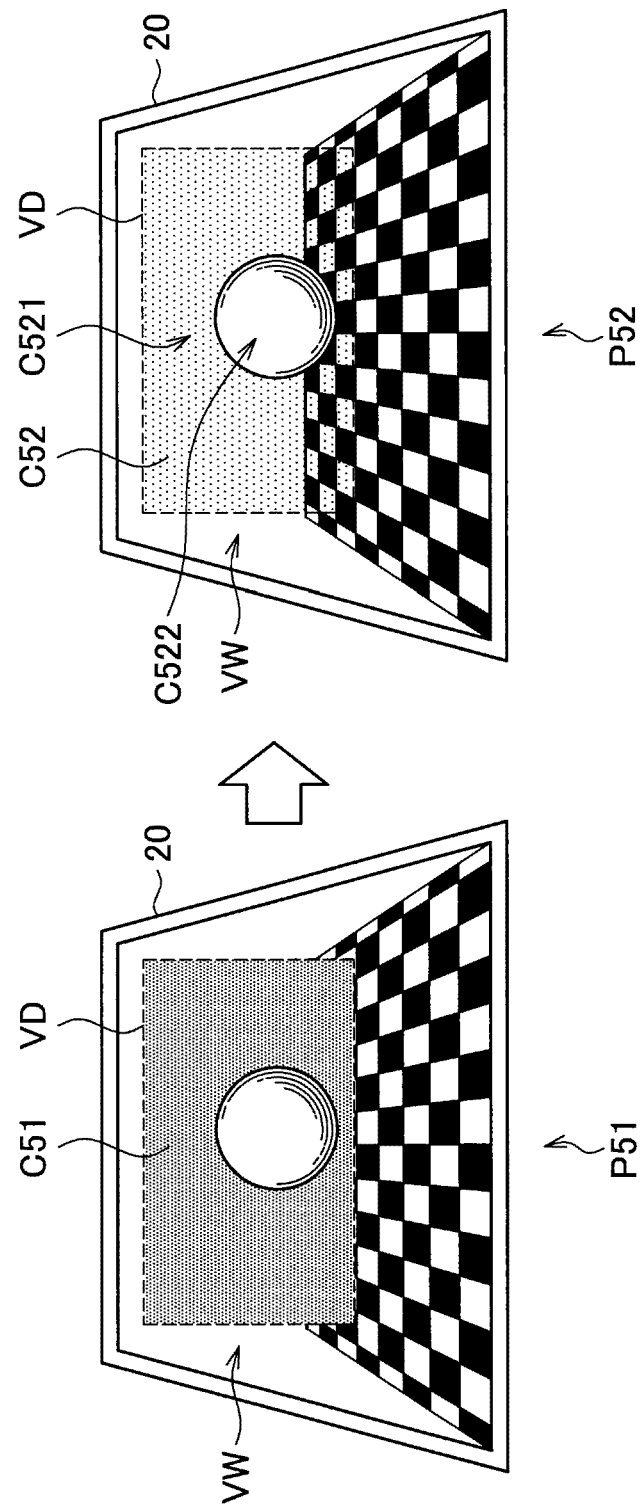
FIG. 15 is an explanatory diagram for explaining a fifth display control example.

Therefore, the display control unit 10 may detect a flat background region from the stereo content, and control the transparency of the stereo content such that the transparency of the detected flat background region is higher than the transparency of other regions in the stereo content. Such an example will be described as the fifth display control example with reference to FIG. 15. FIG. 15 is an explanatory diagram for explaining the fifth display control example.

An example in which stereo content C51 is displayed on the virtual display surface VD arranged in the virtual space VW as indicated by a pattern P51 in FIG. 15 will be considered. In such a case, the display control unit 10 displays, on virtual display surface VD, stereo content C52 that has been controlled to ensure that the transparency of a flat background region C521 is higher than the transparency of a foreground region C552 (other regions), as indicated by a pattern P52. The flat background region C521 can be specified on the basis of, for example, parallax detected from the stereo content C51.

According to the fifth display control described above, the transparency of the flat background region is increased, such that the virtual space VW serving as a background on the farther side is more recognized, and the background region becomes difficult to recognize as a plane. As a result, a sense of real existence as if the foreground region of the stereo content exists in the same space is obtained.

Sixth Display Control Example

Figure 17:
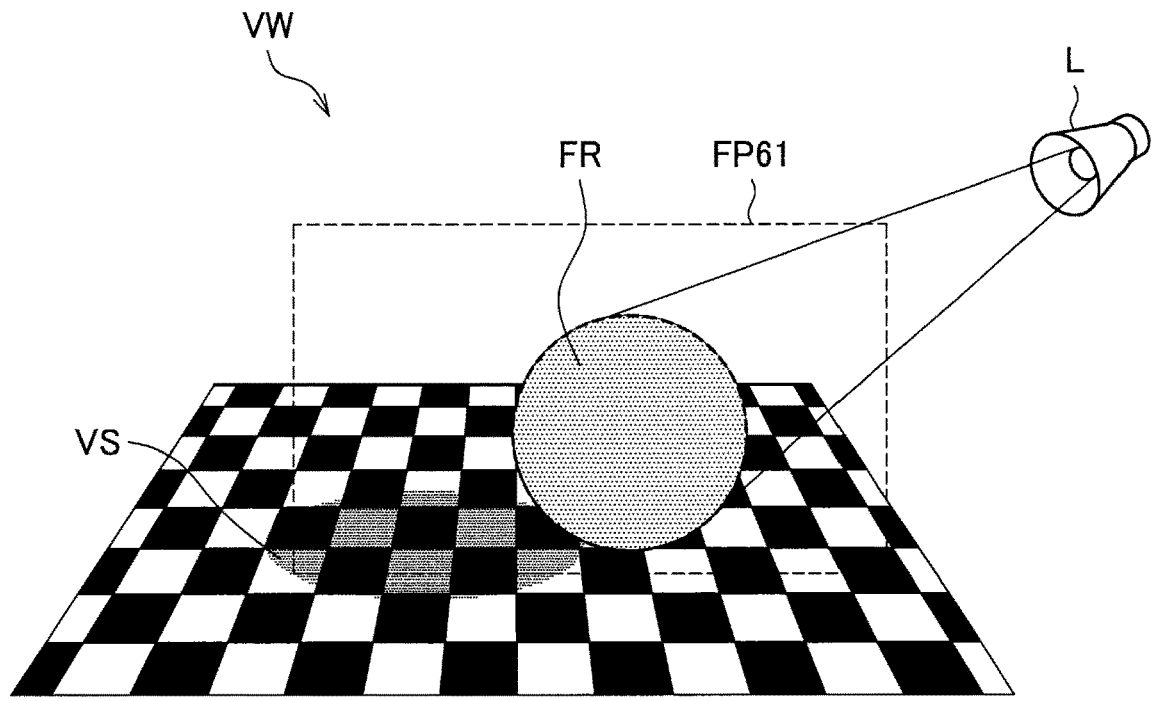
FIG. 17 is an explanatory diagram for explaining the sixth display control example.
Figure 18:
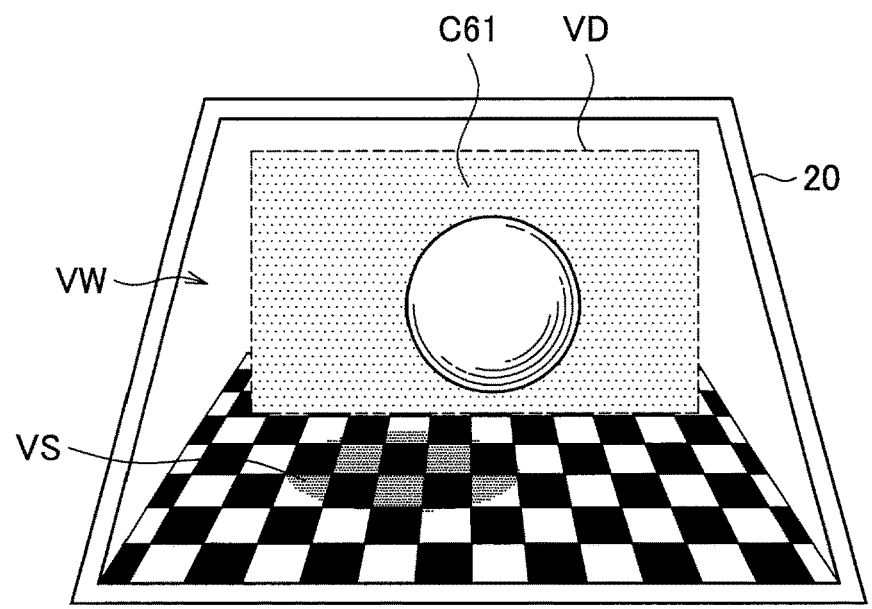
FIG. 18 is an explanatory diagram for explaining the sixth display control example.

Subsequently, a sixth display control example relating to the virtual display surface (hereinafter also simply referred to as a sixth display control example) will be described. The display control unit 10 may display a virtually prepared shadow (virtual shadow) on the basis of the stereo content in order to further enhance the sense of real existence of the stereo content. For example, the display control unit 10 may display a virtual shadow corresponding to the foreground region specified from the stereo content, on the basis of the specified foreground region and the space. Such an example will be described as the sixth display control example with reference to FIGS. 16 to 18. FIGS. 16 to 18 are explanatory diagrams for explaining the sixth display control example.

In a case where stereo content C61 as illustrated in FIG. 16 is displayed, the display control unit 10 generates a depth map DM61 as illustrated in FIG. 16, for example, by detecting the parallax of the stereo content C61. Moreover, as illustrated in FIG. 16, the display control unit 10 specifies a foreground region FR from the depth map DM61, and generates a shadow generation image FP61. In the shadow generation image FP61, a region other than the foreground region FR may be transparent.

The display control unit 10 may display a virtual shadow generated (drawn) by deforming the foreground region FR by projective transformation of the shadow generation image FP61. Furthermore, as illustrated in FIG. 17, the display control unit 10 may arrange the shadow generation image FP61 and a virtually prepared light source L in the virtual space VW, to generate (draw) a virtual shadow VS using the shadow mapping of the CG technique. Note that the arrangement of the shadow generation image FP61 is desirably the same arrangement as the arrangement of the virtual display surface VD or an arrangement according to the arrangement of the virtual display surface VD, for example. Then, as illustrated in FIG. 18, the display control unit 10 displays the stereo content C61 on the virtual display surface VD arranged in the virtual space VW, and also displays the generated (drawn) virtual shadow VS. Owing to such a configuration, the virtual shadow VS corresponding to the foreground region of the stereo content C61 is displayed on a floor plane of the virtual space VW.

According to the sixth display control described above, it is possible to enhance the sense of real existence as if a foreground object included in the stereo content exists in the same space.

Note that, in the above, an example in which the virtual shadow VS is displayed on the basis of the virtual space VW as if the virtual shadow VS exist on a floor of the virtual space VW has been indicated; however, the present technology is not limited to such an example. The shadow may be displayed in the air instead of a surface of the virtual space VW.

Seventh Display Control Example

Subsequently, a seventh display control example relating to the virtual display surface (hereinafter also simply referred to as a seventh display control example) will be described. If the virtual display surface VD protrudes from the display region of the display unit 20, a sticking effect is caused; accordingly, it is desirable that the virtual display surface VD be entirely included in the display region of the display unit 20 in order not to impair the stereoscopic feeling. However, the virtual display surface VD has cases where the virtual display surface VD protrudes from the display region. Therefore, the display control unit 10 may control the position of the virtual display surface VD or the size of the virtual display surface VD such that the display range of the display unit 20 includes the entire virtual display surface VD.

For example, as described with reference to FIG. 6, in a case where the display unit 20 is a display unit of an apparatus worn by the user, the display control unit 10 displays the virtual display surface VD such that the virtual display surface VD is localized, according to the user's viewpoint movement, unless the arrangement of the virtual display surface VD is altered. For this reason, in a case where the arrangement of the virtual display surface VD is not altered, if the user's viewpoint is too close to the virtual display surface VD, there is a possibility that the display region of the display unit 20 no longer includes the entire virtual display surface VD. Therefore, the display control unit 10 may control the position of the virtual display surface VD or the size of the virtual display surface VD on the basis of the position of the user's viewpoint such that the display range of the display unit 20 includes the entire virtual display surface VD.

Furthermore, the seventh display control example is effective even in a case where the display unit 20 is arranged fixedly to the real space. For example, in a case where the display control unit 10 tries to control the arrangement of the virtual display surface VD as described in the other display control examples described above, there is a possibility that the display range of the display unit 20 does not include the entire virtual display surface VD. In such a case, the display control unit 10 may prioritize the display control according to the seventh display control example to control the position of the virtual display surface VD or the size of the virtual display surface VD such that the display range of the display unit 20 includes the entire virtual display surface VD.

According to the seventh display control described above, the position of the virtual display surface VD or the size of the virtual display surface VD is controlled such that the display range of the display unit 20 includes the entire virtual display surface VD, and the occurrence of the sticking effect can be suppressed.

3-2. Configuration Example of Display Control Unit

Figure 19:
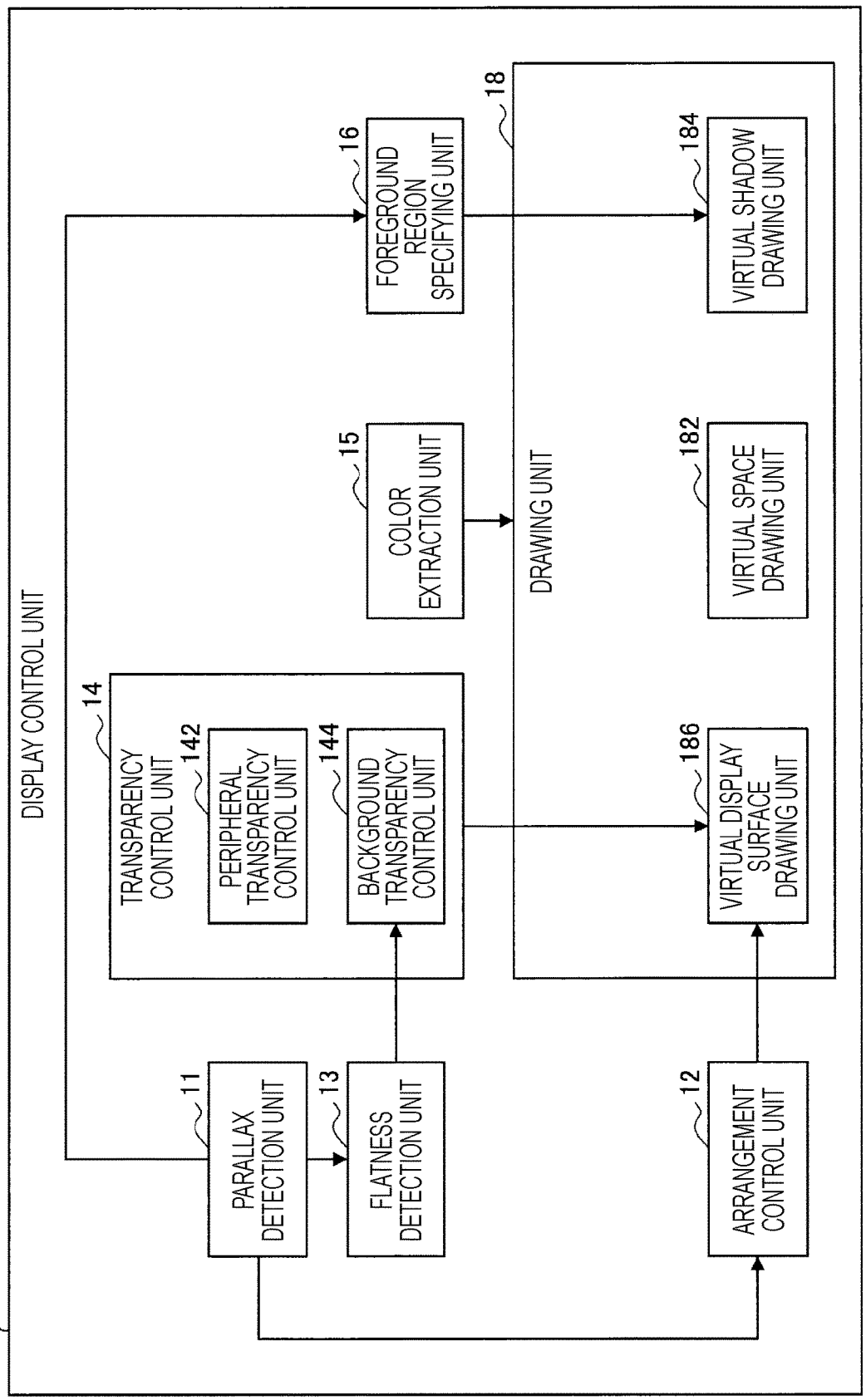
FIG. 19 is a block diagram illustrating an example of the configuration of the display control unit 10 according to the embodiment.

The display control examples relating to the virtual display surface have been described above. Subsequently, an example of the configuration of the display control unit 10 capable of implementing the above-described display control examples relating to the virtual display surface will be described with reference to FIG. 19. FIG. 19 is a block diagram illustrating an example of the configuration of the display control unit 10.

As illustrated in FIG. 19, the display control unit 10 includes functions of a parallax detection unit 11, an arrangement control unit 12, a flatness detection unit 13, a transparency control unit 14, a color extraction unit 15, a foreground region specifying unit 16, and a drawing unit 18.

The parallax detection unit 11 performs, for example, stereo matching between the left-eye image and the right-eye image included in the stereo content, and detects the parallax of the stereo content. Furthermore, the parallax detection unit 11 outputs parallax information regarding the detected parallax to the arrangement control unit 12, the flatness detection unit 13, and the foreground region specifying unit 16.

The arrangement control unit 12 controls the arrangement of the virtual display surface drawn by the drawing unit 18. The arrangement control unit 12 controls the arrangement, of the virtual display surface such that, for example, the above-described first display control example, third display control example, and seventh display control example are implemented. For example, the arrangement control unit 12 implements arrangement control as in the first control example and the seventh control example on the basis of information regarding the position of the user's viewpoint provided from the sensor unit 30. In addition, the arrangement control unit 12 implements arrangement control as in the third display control example on the basis of the parallax range (an example of parallax information) detected by the parallax detection unit 11.

The flatness detection unit 13 detects a flat background region from the stereo content and outputs the detected flat background region to the transparency control unit 14. The flatness detection unit 13 may detect, for example, a region with a small change in parallax as a flat background region, on the basis of the parallax detected by the parallax detection unit 11.

The transparency control unit 14 controls the transparency of the stereo content displayed on the virtual display surface. As illustrated in FIG. 19, the transparency control unit 14 can function as a peripheral transparency control unit 142 and a background transparency control unit 144.

The peripheral transparency control unit 142 controls the transparency of a peripheral portion of the stereo content such that the above-described second display control example is implemented. For example, the peripheral transparency control unit 142 controls the transparency of the stereo content such that the transparency becomes higher as an edge portion of the stereo content is closer.

The background transparency control unit 144 controls the transparency of the stereo content to ensure that the transparency of the flat background region detected by the flatness detection unit 13 is higher than the transparency of other regions of the stereo content such that the above-described fifth display control example is implemented.

The color extraction unit 15 extracts color information regarding the stereo content from the stereo content and outputs the extracted color information to the drawing unit 18. For example, the color information regarding the stereo content may be information regarding luminance, saturation, and the like of a primary background color of the stereo content, an illumination light color estimated from the stereo content, or the color of an edge portion of the stereo content.

The foreground region specifying unit 16 specifies the foreground region from the stereo content. For example, the foreground region specifying unit 16 may specify the foreground region from the depth map based on the parallax information provided from the parallax detection unit 11, as described with reference to FIG. 16. Note that the method of specifying the foreground region by the foreground region specifying unit 16 is not limited to the above-described example and, for example, the region of an object detected by a well-known object detection scheme may be specified as the foreground region.

The drawing unit 18 functions as a virtual space drawing unit 182, a virtual shadow drawing unit 184, and a virtual display surface drawing unit 186 as illustrated in FIG. 19, and draws the virtual space, virtual shadow, and virtual display surface to be displayed on the display unit 20, respectively.

The virtual space drawing unit 182 may draw the virtual space on the basis of the color information provided from the color extraction unit 15 such that the above-described fourth display control example is implemented.

The virtual shadow drawing unit 184 draws the virtual shadow on the basis of the foreground region specified by the foreground region specifying unit 16 such that the above-described sixth display control example is implemented. Furthermore, the foreground region specify-ng unit 1 may draw the virtual shadow further on the basis of the virtual space drawn by the virtual space drawing unit 182.

The virtual display surface drawing unit 186 arranges the virtual display surface in the virtual space in accordance with the control of the arrangement control unit 12, and draws the stereo content on the virtual display surface. Owing to such a configuration, the first display control example, the second display control example, and the seventh display control example described above are implemented. In addition, the transparency of the stereo content drawn by the virtual display surface drawing unit 186 is controlled by the transparency control unit 14. Owing to such a configuration, the third display control example and the fifth display control example described above are implemented.

Heretofore, an example of the configuration of the display control unit 10 that can implement the above-described display control examples has been described. Note that the configuration illustrated in FIG. 19 is an example, and the display control unit 10 may not have ail the functions illustrated in FIG. 19. For example, in a case where some of the display control examples described above are not implemented, the display control unit 10 may not have functions for implementing the some of the display control examples.

4. Action Example

Figure 20:
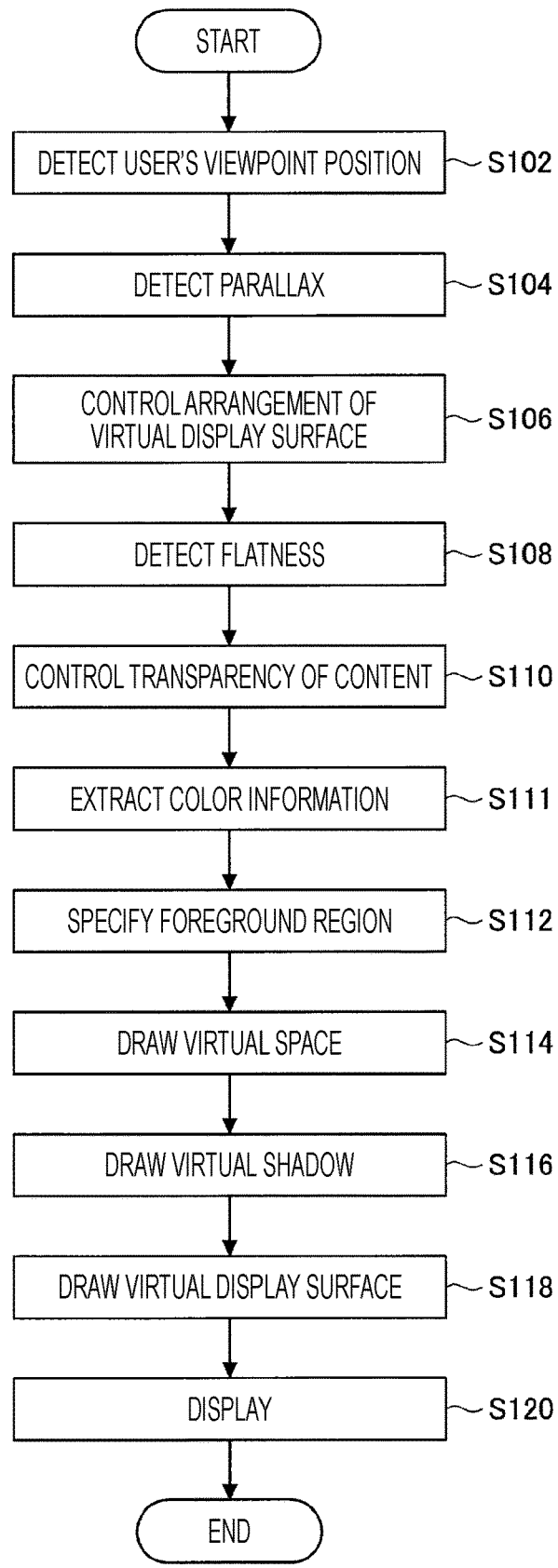
FIG. 20 is a flowchart illustrating an action example of the information processing apparatus 1 according to the embodiment.

Subsequently, an action example of the information processing apparatus 1 according to the present embodiment will be described with reference to FIG. 20. FIG. 20 is a flowchart illustrating an action example of the information processing apparatus 1 according to the present embodiment.

First, as illustrated in FIG. 20, the sensor unit 30 detects the position of the user's viewpoint (S102). Subsequently, the parallax detection unit 11 of the display control unit 10 detects parallax from the stereo content and acquires parallax information (S104). Subsequently, the arrangement control unit 12 of the display control unit 10 controls the arrangement of the virtual display surface on the basis of the position of the user's viewpoint and the parallax information (S106).

Subsequently, the flatness detection unit 13 of the display control unit 10 detects a flat background region from the stereo content on the basis of the parallax information (S108). Subsequently, the transparency control unit 14 of the display control unit 10 controls the transparency of the stereo content (S110). Subsequently, the color extraction unit 15 of the display control unit 10 extracts color information from the stereo content (S111). Subsequently, the foreground region specifying unit 16 of the display control unit 10 specifies the foreground region from the stereo content on the basis of the parallax information (S112).

Subsequently, the virtual space, the virtual shadow, and the virtual display surface are drawn by the drawing unit 18 of the display control unit 10 (S114 to S118). First, in step S114, the virtual space drawing unit 182 of the drawing unit 18 draws the virtual space on the basis of the color information extracted in step S111.

Subsequently, in step S116, the virtual shadow drawing unit 184 of the drawing unit 18 draws the virtual shadow on the basis of the foreground region detected in step S112 and the virtual space drawn in step S114.

Subsequently, in step S118, the virtual display surface drawing unit 186 of the drawing unit 18 arranges the virtual display surface in accordance with the arrangement control in step 106, and draws the stereo content on the virtual display surface in accordance with the control of the transparency of the stereo content in step S110.

Then, the virtual space, virtual shadow, and stereo content drawn by the drawing unit 18 are displayed on the display unit 20 (S120).

5. Modifications

Heretofore, the embodiments of the present disclosure have been described. Hereinafter, some modifications of the embodiments of the present disclosure will be described. Note that each modification described below may be applied alone to the embodiments of the present disclosure, or may be applied to the embodiments of the present disclosure in combination. Furthermore, each modification may be applied instead of the configuration described in the embodiments of the present disclosure, or may be additionally applied to the configuration described in the embodiments of the present disclosure.

5-1. First Modification

Figure 21:
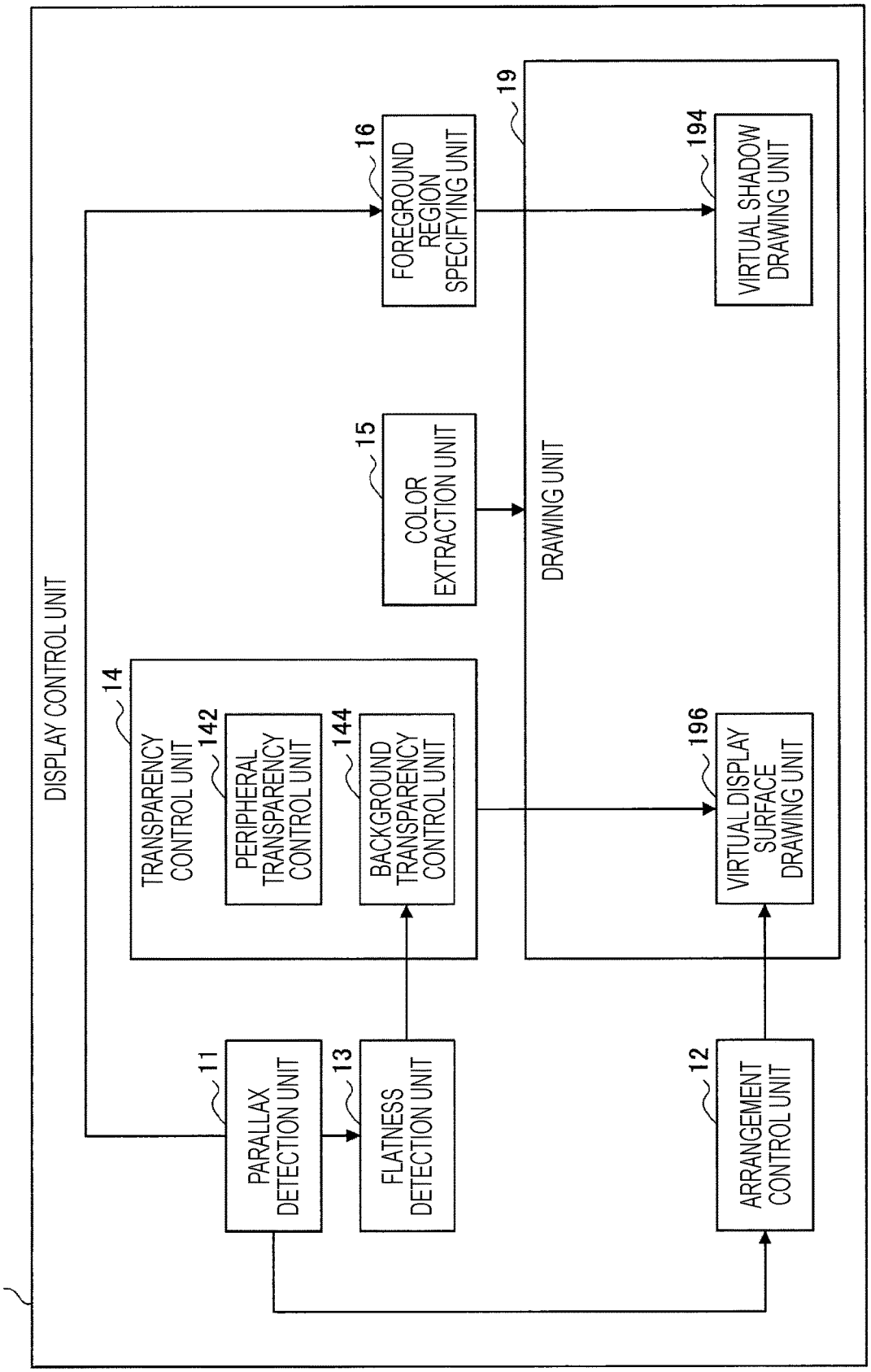
FIG. 21 is a block diagram illustrating a configuration example of a display control unit 10-2 according to a first modification.

In the above, a case where the display control unit 10 arranges the virtual display surface in the virtual space has been mainly described; however, as described above, the display control unit may arrange the virtual display surface in the real space. Such an example will be described as a first modification. In addition, the display control unit according to the first modification is referred to as a display control unit 10-2, and a configuration example of the display control unit 10-2 will be described with reference to FIG. 21. FIG. 21 is a block diagram illustrating a configuration example of the display control unit 10-2 according to the first modification.

Note that, in the configuration of the display control unit 10-2 illustrated in FIG. 21, components similar to those of the display control unit 10 illustrated in FIG. 19 are denoted by the same reference numerals, and the description thereof will be omitted. The display control unit 10-2 is different from the display control unit 10 illustrated in FIG. 19 in that the function of a drawing unit 19 is different from the function of the drawing unit 18. The drawing unit 19 functions as a virtual shadow drawing unit 194 and a virtual display surface drawing unit 196 as illustrated in FIG. 21.

Here, the display control unit. 10-2 illustrated in FIG. 21 has a configuration example for implementing the first display control example to the seventh display control example described above, similarly to the display control unit 10 illustrated in FIG. 19. However, in the present modification, the virtual display surface is arranged in the real space instead of the virtual space.

Thus, the virtual shadow drawing method in the sixth display control example, the drawing method for reflecting the transparency of the stereo content in the space in the second display control example and the fifth display control example are different. On the other hand, the first display control example, the second display control example, and the seventh display control example described above are control of types that do not depend on the space.

Similar to the virtual shadow drawing unit 184 described above, the virtual shadow drawing unit 194 draws the virtual shadow on the basis of the foreground region specified by the foreground region specifying unit 16 such that the above-described sixth display control example is implemented. However, the virtual shadow drawing unit 194 may draw the virtual shadow further on the basis of the real space. For example, the virtual shadow drawing unit 194 may draw the virtual shadow on the basis of information regarding the real space acquired by the sensor unit 30 (for example, an image obtained by imaging) as if virtual shadows exist on the floor, ground, wall, and the like in the real space.

Similar to the virtual display surface drawing unit 186 described above, the virtual display surface drawing unit 196 arranges the virtual display surface in the virtual space in accordance with the control of the arrangement control unit 12, and draws the stereo content on the virtual display surface. Owing to such a configuration, the first display control example, the second display control example, and the seventh display control example described above are implemented. In addition, the transparency of the stereo content drawn by the virtual display surface drawing unit 196 is controlled by the transparency control unit 14.

In the present modification, the transparency control in the second display control example and the fifth display control example may be control of the level of luminance and saturation, and the virtual display surface drawing unit 196 may draw the stereo content on the virtual display surface with luminance and saturation according to the transparency control of the transparency control unit 14.

Furthermore, although not illustrated, the drawing unit 19 may have the function of drawing an effect like flare illustrated in FIG. 14 on the basis of the color information extracted by the color extraction unit 15 in order to implement the above-described fourth display control example.

As described above, the first display control example to the seventh display control example are implemented also in a case where the virtual display surface is arranged in the real space.

5-2. Second Modification

In a case where the display unit 20 is fixedly arranged in the real space, it is desirable to draw an exact viewpoint image that can be seen from the user, on the basis of the position of the user's viewpoint. By performing such drawing, it is possible to allow the user to view as if the virtual space is localized. Such an example will be described as a second modification with reference to FIG. 22. FIG. 22 is an explanatory diagram for explaining the second modification.

As illustrated in FIG. 22, the display control unit according to the present modification virtually installs a virtual camera VC with the position of the user's viewpoint as a virtual viewpoint and, for example, performs drawing concerning the virtual space VW and the virtual display surface VD described above to acquire a viewpoint image at this virtual viewpoint. The display control unit according to the present modification may set the direction of the virtual camera VC on the basis of the user's orientation (face posture or line-of-sight direction), or may set the direction of the virtual camera VC such that the virtual camera faces the virtual display surface VD.

Subsequently, the display control unit according to the present modification virtually arranges a virtual projector VP at the same position and direction as those of the virtual camera VC, and projects the viewpoint image from the virtual projector VP on the top of a virtual front surface VF of the display unit 20 virtually installed. Here, the virtual projector VP may project the viewpoint image with the same parameters (for example, a focal length parameter and a distortion parameter) as those of the virtual camera VC.

Moreover, the display control unit according to the present modification orthogonally projects an image generated by being projected on the virtual front surface VF, and acquires a display picture DP. The display picture DP is given as a distorted image when viewed from a position other than the current user's viewpoint, but is perceived as a normal image when viewed from the position of the current user's viewpoint.

Although only the processing for one viewpoint is illustrated in FIG. 22, the display control unit according to the present modification performs the above processing at two viewpoints of left-eye and right-eye viewpoints, and acquires a display picture for the left eye and a display picture for the right eye.

According to the second modification described above, it is possible to allow the user to view as if the virtual space is localized. Note that the second modification can be similarly applied to a case where the virtual display surface is arranged in the real space.

5-3. Third Modification

In the above-described embodiments, an example in which stereo content including the left-eye image and the right-eye image as a stereoscopic image is used has been described; however, the present technology is not limited to such an example. For example, the stereoscopic image may be an image including a two-dimensional image and a parallax image, or may be an image including a two-dimensional image and a distance image. Note that, in a case where the stereoscopic image includes a parallax image or a distance image, the parallax information can be acquired from the parallax image or the distance image.

6. Hardware Configuration Example

Heretofore, the embodiments of the present disclosure have been described. Finally, a hardware configuration of the information processing apparatus according to the embodiments of the present disclosure will be described with reference to FIG. 23. FIG. 23 is a block diagram illustrating a hardware configuration example of the information processing apparatus 1 according to the embodiments of the present disclosure. Information processing by the information processing apparatus 1 according to the embodiments of the present disclosure is implemented by cooperation between software and hardware described below.

As illustrated in FIG. 23, the information processing apparatus 1 includes a central processing unit (CPU) 901, a read only memory (ROM) 902, a random access memory (RAM) 903, and a host bus 904a. Furthermore, the information processing apparatus 1 includes a bridge 904, an external bus 904b, an interface 905, an input apparatus 906, an output apparatus 907, a storage apparatus 908, a drive 909, a connection port 911, a communication apparatus 913, and a sensor 915. The information processing apparatus 1 may include a processing circuit such as a digital signal processor (DSP) or an application specific integrated circuit (ASIC) in place of or together with the CPU 901.

The CPU 901 functions as an arithmetic processing apparatus and a control apparatus, and controls the overall action in the information processing apparatus 1 in accordance with various programs. Furthermore, the CPU 901 may be a microprocessor. The ROM 902 stores programs, calculation parameters, and the like used by the CPU 901. The RAM 903 temporarily stores programs used in the execution of the CPU 901, parameters that appropriately change during the execution, and the like. The CPU 901 can form, for example, the display control unit 10.

The CPU 901, the ROM 902, and the RAM 903 are mutually connected by the host bus 904a including a CPU bus and the like. The host bus 904a is connected to the external bus 904b such as a peripheral component interconnect/interface (PCI) bus via the bridge 904. Note that the host bus 904a, the bridge 904, and the external bus 904b do not necessarily need to be separately configured, and the functions of these members may be equipped in one bus.

The input apparatus 906 is implemented by, for example, an apparatus to which information is input by the user, such as a mouse, a keyboard, a touch panel, a button, a microphone, a switch, and a lever. Furthermore, for example, the input apparatus 906 may be a remote controlling apparatus utilizing infrared rays or other electrical waves, or may be externally connected equipment such as a mobile phone or a personal digital assistant (PDA) compatible with the operation of the information processing apparatus 1. Moreover, the input apparatus 906 may include, for example, an input control circuit that generates an input signal on the basis of information input by the user using the above-mentioned input means and outputs the generated input signal to the CPU 901. The user of the information processing apparatus 1 can input various types of data to the information processing apparatus 1 or instruct the information processing apparatus 1 on processing actions by operating this input apparatus 906.

The output apparatus 907 is formed by an apparatus capable of visually or audibly notify the user of the acquired information. Examples of such an apparatus include a display apparatus such as a cathode ray tube (CRT) display apparatus, a liquid crystal display apparatus, a plasma display apparatus, an electroluminescence (EL) display apparatus, and a lamp, a sound output apparatus such as a speaker and a headphone, and a printer apparatus. The output apparatus 907 outputs, for example, results obtained by various types of processing performed by the information processing apparatus 1. Specifically, the display apparatus visually displays results obtained by various types of processing performed by the information processing apparatus 1 in a variety of formats such as text, images, tables, and graphs. Meanwhile, the sound output apparatus converts an audio signal made up of reproduced sound data, acoustic data, or the like into an analog signal and audibly outputs the converted analog signal. The output apparatus 907 can form, for example, the display unit 20.

The storage apparatus 908 is an apparatus for keeping data formed as an example of the storage unit of the information processing apparatus 1. The storage apparatus 908 is implemented by, for example, a magnetic storage unit device such as a hard disk drive (HDD), a semiconductor storing device, an optical storing device, or a magneto-optical storing device. The storage apparatus 908 may include a storage medium, a recording apparatus that records data in the storage medium, a reading apparatus that reads data from the storage medium, a deletion apparatus that deletes data recorded in the storage medium, and the like. This storage apparatus 908 keeps programs and various types of data executed by the CPU 901, various types of data acquired from the outside, and the like. The above-described storage apparatus 908 can form, for example, the storage unit 40.

The drive 909 is a reader/writer for a storage medium, and is incorporated in or externally attached to the information processing apparatus 1. The drive 909 reads information recorded in the mounted removable storage medium such as a magnetic disk, an optical disc, a magneto-optical disk, or a semiconductor memory, and outputs the read information to the RAM 903. Furthermore, the drive 909 can also write information to a removable storage medium.

The connection port 911 is an interface connected to external equipment, and is a connection gate to external equipment capable of data transfer by, for example, universal serial bus (USB).

The communication apparatus 913 is, for example, a communication interface formed by a communication device or the like for connecting to a network 920. The communication apparatus 913 is, for example, a communication card for a wired or wireless local area network (LAN), long term evolution (LTE), Bluetooth (registered trademark), wireless USB (WUSB), or the like. Furthermore, the communication apparatus 913 may be a router for optical communication, a router for asymmetric digital subscriber line (ADSL), a modem for various communications, or the like. This communication apparatus 913 can transmit and receive signals and the like to and from, for example, the Internet or other communication equipment in line with a predetermined protocol such as transmission control protocol/Internet protocol (TCP/IP).

The sensor 915 serves as, for example, various sensors such as an acceleration sensor, a gyro sensor, a geomagnetic sensor, an optical sensor, a sound sensor, a distance measuring sensor, and a force sensor. The sensor 915 acquires information regarding the environment surrounding the information processing apparatus 1, including information regarding the self-state of the information processing apparatus 1, such as the orientation and movement speed of the information processing apparatus 1, the brightness and noise surrounding the information processing apparatus 1, and the like. Furthermore, the sensor 915 may include a global positioning system (GPS) sensor that receives a GPS signal and measures the latitude, longitude, and altitude of the apparatus. The sensor 915 can form, for example, the sensor unit 30.

Note that the network 920 is a wired or wireless transfer path for information transmitted from an apparatus connected to the network 920. For example, the network 920 may include a public line network such as the Internet, a telephone line network, and a satellite communication network, various local area networks (LANs) including Ethernet (registered trademark), and a wide area network (WAN). In addition, the network 920 may include a leased line network such as an Internet protocol-virtual private network (IP-VPN).

Heretofore, a hardware configuration example capable of implementing the function of the information processing apparatus 1 according to the embodiments of the present disclosure has been illustrated. Each constituent element described above may be implemented using a general-purpose member, or may be implemented by hardware specialized for the function of each constituent element. Accordingly, it is possible to appropriately alter the hardware configuration to be used according to the technological level at the time of carrying out the embodiments of the present disclosure.

Note that a computer program for implementing each function of the information processing apparatus 1 according to the embodiments of the present disclosure as described above can be produced and equipped in a personal computer (PC) or the like. Furthermore, a computer readable recording medium in which such a computer program is kept can be provided. Examples of the recording medium include a magnetic disk, an optical disc, a magneto-optical disk, and a flash memory. In addition, the above computer program may be distributed via, for example, a network without using a recording medium.

7. Conclusion

As described above, according to the embodiments of the present disclosure, by displaying a stereoscopic image on the virtual display surface, the occurrence of the sticking effect can be suppressed and loss of stereoscopic feeling or the occurrence of sickness can be suppressed. Moreover, by controlling the arrangement of the virtual display surface on the basis of the position of the user's viewpoint, the user can perform observation comfortably even if the user's viewpoint moves.

The favorable embodiments of the present disclosure have been described in detail thus far with reference to the accompanying drawings. However, the technological scope of the present disclosure is not limited to these examples. It is obvious that a person with average knowledge on the technological field of the present disclosure can arrive at various alterations or variations within the range of the technological spirit disclosed in claims and as a matter of course, these alterations or variations are comprehended as part of the technological scope of the present disclosure.

For example, each step in each action according to the above embodiments does not necessarily have to be processed in time series in the order described in the flowchart in FIG. 20. Each step in each action may be processed in an order different from the order described in the flowchart, or may be processed in parallel.

Furthermore, the effects described in the present description are merely illustrative or exemplary and are not limiting. That is, the technology according to the present disclosure can exhibit other effects obvious to those skilled in the art from the description of the present description together with the above-described effects or instead of the above-described effects.

Note that configurations as described below are also within the technological scope of the present disclosure.

(1)

An information processing apparatus including
a display control unit that controls display of a display unit such that a stereoscopic image is displayed on a virtual display surface arranged in a space, in which
the display control unit controls an arrangement of the virtual display surface in the space on the basis of a position of a viewpoint of a user.

(2)

The information processing apparatus according to (1) above, in which the display control unit controls the arrangement of the virtual display surface such that a straight line linking the viewpoint of the user and a center point of the virtual display surface satisfies a predetermined condition concerning a relationship with the virtual display surface.

(3)

The information processing apparatus according to (2) above, in which the predetermined condition includes a condition relating to an angle defined by the straight line and the virtual display surface.

(4)

The Information processing apparatus according to (3) above, in which the display control unit controls a position of the virtual display surface or a size of the virtual display surface such that a display range of the display unit includes the entire virtual display surface.

(5)

The information processing apparatus according to (4) above, in which the display unit includes a display unit of an apparatus worn by the user.

(6)

The information processing apparatus according to any one of (1) to (5) above, in which the display control unit controls the arrangement of the virtual display surface further on the basis of parallax information concerning the stereoscopic image.

(7)

The information processing apparatus according to (3) above, in which the display control unit controls a position of the virtual display surface or a size of the virtual display surface on the basis of an amount of pop-out or an amount of retraction from the display unit specified on the basis of the parallax information.

(8)

The information processing apparatus according to (7) above, in which the display control unit controls the position of the virtual display surface or the size of the virtual display surface such that any one of the amount of pop-out, the amount of retraction, and a total of the amount of pop-out and the amount of retraction is contained within a predetermined range.

(9)

The information processing apparatus according to any one of (1) to (8) above, in which the display control unit controls transparency of the stereoscopic image displayed on the virtual display surface.

(10)

The information processing apparatus according to (9) above, in which the display control unit controls the transparency of the stereoscopic image such that the transparency becomes higher as an edge portion of the stereoscopic image is closer.

(11)

The information processing apparatus according to (9) or (10) above, in which the display control unit controls the transparency of the stereoscopic image on the basis of the stereoscopic image.

(12)

The information processing apparatus according to (11) above, in which the display control unit controls the transparency of the stereoscopic image such that transparency of a flat background region detected from the stereoscopic image is higher than transparency of other regions in the stereoscopic image.

(13)

The information processing apparatus according to any one of (1) to (12) above, in which the display control unit controls a color around the virtual display surface on the basis of color information regarding the stereoscopic image.

(14)

The information processing apparatus according to any one of (1) to (13) above, in which the display control unit displays a shadow on the basis of the stereoscopic image.

(15)

The information processing apparatus according to (14) above, in which the display control unit displays the shadow on the basis of a foreground region specified from the stereoscopic image.

(16)

The information processing apparatus according to (14) or (15) above, in which the display control unit displays the shadow further on the basis of the space.

(17)

The information processing apparatus according to any one of (1) to (16) above, in which the space includes a virtual space or a real space.

(18)

The information processing apparatus according to (17) above, in which the display unit has an optical transmissive property, and the space includes the real space.

(19)

An information processing method including controlling, by a processor, display of a display unit such that a stereoscopic image is displayed on a virtual display surface arranged in a space, in which an arrangement of the virtual display surface in the space is controlled on the basis of a position of a viewpoint of a user.

(20)

A program that causes a computer to implement a display control function that controls display of a display unit such that a stereoscopic image is displayed on a virtual display surface arranged in a space, in which the display control function controls an arrangement of the virtual display surface in the space on the basis of a position of a viewpoint of a user.

REFERENCE SIGNS LIST

1 Information processing apparatus
10 Display control unit
20 Display unit
30 Sensor unit
40 Storage unit

The invention claimed is:

1. An information processing apparatus comprising a display control unit that controls display of a display unit such that a stereoscopic image is displayed on a virtual display surface arranged in a space, wherein
the display control unit controls an arrangement of the virtual display surface in the space on a basis of a position of a viewpoint of a user,
the display control unit controls the arrangement of the virtual display surface further on a basis of a parallax range included in the stereoscopic image, and
the display control unit is implemented via at least one processor.

2. The information processing apparatus according to claim 1, wherein the display control unit controls the arrangement of the virtual display surface such that a straight line linking the viewpoint of the user and a center point of the virtual display surface satisfies a predetermined condition concerning a relationship with the virtual display surface.

3. The information processing apparatus according to claim 2, wherein the predetermined condition includes a condition relating to an angle defined by the straight line and the virtual display surface.

4. The Information processing apparatus according to claim 3, wherein the display control unit controls a position of the virtual display surface or a size of the virtual display surface such that a display range of the display unit includes the entire virtual display surface.

5. The information processing apparatus according to claim 4, wherein the display unit includes a display unit of an apparatus worn by the user.

6. The information processing apparatus according to claim 1, wherein the display control unit controls a position of the virtual display surface or a size of the virtual display surface on a basis of an amount of pop-out or an amount of retraction from the display unit specified on the basis of the parallax range.

7. The information processing apparatus according to claim 6, wherein the display control unit controls the position of the virtual display surface or the size of the virtual display surface such that any one of the amount of pop-out, the amount of retraction, and a total amount including both the amount of pop-out and the amount of retraction is contained within the parallax range.

8. The information processing apparatus according to claim 1, wherein the display control unit controls transparency of the stereoscopic image displayed on the virtual display surface.

9. The information processing apparatus according to claim 8, wherein the display control unit controls the transparency of the stereoscopic image such that the transparency becomes higher as an edge portion of the stereoscopic image is closer.

10. The information processing apparatus according to claim 8, wherein the display control unit controls the transparency of the stereoscopic image on a basis of the stereoscopic image.

11. The information processing apparatus according to claim 10, wherein the display control unit controls the transparency of the stereoscopic image such that transparency of a flat background region detected from the stereoscopic image is higher than transparency of other regions in the stereoscopic image.

12. The information processing apparatus according to claim 1, wherein the display control unit controls a color around the virtual display surface on a basis of color information regarding the stereoscopic image.

13. The information processing apparatus according to claim 1, wherein the display control unit displays a shadow on a basis of the stereoscopic image.

14. The information processing apparatus according to claim 13, wherein the display control unit displays the shadow on a basis of a foreground region specified from the stereoscopic image.

15. The information processing apparatus according to claim 13, wherein the display control unit displays the shadow further on a basis of the space.

16. The information processing apparatus according to claim 15, wherein the space includes a virtual space or a real space.

17. The information processing apparatus according to claim 16, wherein the display unit has an optical transmissive property, and the space includes the real space.

18. An information processing method comprising
controlling, by a processor, display of a display unit such that a stereoscopic image is displayed on a virtual display surface arranged in a space, wherein
an arrangement of the virtual display surface in the space is controlled on a basis of a position of a viewpoint of a user, and
the arrangement of the virtual display surface is controlled further on a basis of a parallax range included in the stereoscopic image.

19. A non-transitory computer-readable medium having embodied thereon a program, which when executed by a computer causes the computer to execute a method, the method comprising:
controlling display of a display unit such that a stereoscopic image is displayed on a virtual display surface arranged in a space, wherein
an arrangement of the virtual display surface in the space is controlled on a basis of a position of a viewpoint of a user, and
the arrangement of the virtual display surface is controlled further on a basis of a parallax range included in the stereoscopic image.

* * * * *